United States Patent
Li et al.

(10) Patent No.: US 11,223,568 B2
(45) Date of Patent: Jan. 11, 2022

(54) PACKET PROCESSING METHOD AND APPARATUS

(71) Applicant: Huawei Technologies Co., Ltd., Shenzhen (CN)

(72) Inventors: Nan Li, Beijing (CN); Chao Huang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/832,666

(22) Filed: Mar. 27, 2020

(65) Prior Publication Data

US 2020/0236057 A1    Jul. 23, 2020

Related U.S. Application Data

(63) Continuation of application No. PCT/CN2017/104407, filed on Sep. 29, 2017.

(51) Int. Cl.
*H04L 12/823* (2013.01)
*H04L 12/723* (2013.01)
*H04L 12/741* (2013.01)
*H04L 12/801* (2013.01)
*H04L 12/851* (2013.01)
(Continued)

(52) U.S. Cl.
CPC ........... *H04L 47/326* (2013.01); *H04L 45/50* (2013.01); *H04L 45/74* (2013.01); *H04L 47/12* (2013.01); *H04L 47/2483* (2013.01); *H04L 47/28* (2013.01); *H04L 47/31* (2013.01); *H04L 47/6215* (2013.01)

(58) Field of Classification Search
None
See application file for complete search history.

(56) References Cited

U.S. PATENT DOCUMENTS 6,188,698 B1 * 2/2001 Galand ............... H04L 47/10
370/229
6,690,645 B1   2/2004 Aweya et al.
(Continued)

FOREIGN PATENT DOCUMENTS

CN    101188611 A    5/2008
CN    101800699 A    8/2010
(Continued)

OTHER PUBLICATIONS

"IEEE Standard for Local and metropolitan area networks—Bridges and Bridged Networks," IEEE Std 802.1Q, 2014, 1832 pages.
(Continued)

*Primary Examiner* — Eunsook Choi
(74) *Attorney, Agent, or Firm* — Conley Rose, P.C.

(57) ABSTRACT

A packet processing method includes receiving, by a forwarding apparatus, a first packet, where the first packet belongs to a first packet flow, determining, by the forwarding apparatus, at least two types of information in the following four types of information a duration of staying in a first memory by the first packet flow, usage of the first memory, whether the first packet flow is a victim of a congestion control mechanism, and a drop priority of the first packet, and determining, by the forwarding apparatus based on the at least two types of information, whether explicit congestion notification marking needs to be performed on the first packet.

20 Claims, 4 Drawing Sheets

---

A forwarding apparatus receives a first packet    S501

The forwarding apparatus determines at least two types of information in four types of information related to the first packet    S502

The forwarding apparatus determines, according to the at least two types of information related to the first packet, whether explicit congestion notification marking needs to be performed on the first packet    S503

When determining that explicit congestion notification marking needs to be performed on the first packet, the forwarding apparatus performs explicit congestion notification marking on the first packet    S504

(51) Int. Cl.
*H04L 12/841* (2013.01)
*H04L 12/833* (2013.01)
*H04L 12/863* (2013.01)

(56) References Cited

U.S. PATENT DOCUMENTS

| | | | | |
|---|---|---|---|---|
| 7,680,139 | B1* | 3/2010 | Jones | H04L 49/9084 370/414 |
| 8,797,877 | B1* | 8/2014 | Perla | H04L 49/90 370/235 |
| 9,942,161 | B1* | 4/2018 | Chen | H04L 47/2491 |
| 10,721,187 | B1* | 7/2020 | Goldman | H04L 49/206 |
| 2006/0098681 | A1* | 5/2006 | Cafiero | H04L 61/6045 370/445 |
| 2006/0171318 | A1* | 8/2006 | Bergamasco | H04L 47/26 370/235 |
| 2015/0023366 | A1* | 1/2015 | Lai | H04L 47/32 370/412 |
| 2015/0029887 | A1* | 1/2015 | Briscoe | H04L 47/326 370/252 |
| 2017/0019803 | A1 | 1/2017 | Nguyen et al. | |
| 2019/0014053 | A1 | 1/2019 | Huang et al. | |
| 2019/0089644 | A1* | 3/2019 | Shpiner | H04L 47/50 |
| 2020/0204460 | A1* | 6/2020 | Schneider | H04L 41/0645 |

FOREIGN PATENT DOCUMENTS

| | | |
|---|---|---|
| CN | 101984608 A | 3/2011 |
| CN | 103414650 A | 11/2013 |
| CN | 104378308 A | 2/2015 |
| CN | 104753810 A | 7/2015 |
| CN | 107196877 A | 9/2017 |
| WO | 2013132213 A1 | 9/2013 |

OTHER PUBLICATIONS

Rosen, E., et al., "MPLS Label Stack Encoding," RFC 3032, Jan. 2001, 23 pages.
Bai, W., et al., "Enabling ECN in Multi-Service Multi-Queue Data Centers," Mar. 16, 2016, XP055702104, 65 pages.

* cited by examiner

PACKET PROCESSING METHOD AND APPARATUS

CROSS-REFERENCE TO RELATED APPLICATIONS

This application is a continuation application of International Patent Application No. PCT/CN2017/104407, filed on Sep. 29, 2017, which is hereby incorporated by reference in its entirety.

TECHNICAL FIELD

Embodiments of this application relate to the field of communications technologies, and in particular, to a packet processing method and apparatus.

BACKGROUND

In other approaches, a forwarding apparatus (for example, a router) may determine, based on a feature of a packet flow (for example, a transmission rate of the packet flow), whether to perform explicit congestion notification (ECN) marking on a packet or whether to drop a packet. When the solution in other approaches is used to determine whether to perform ECN marking or determine whether to drop the packet, precision is not high.

SUMMARY

This application provides a packet processing method and apparatus to help improve precision when determining whether to perform ECN marking on a packet or determining whether to drop a packet.

According to a first aspect, a packet processing method is provided, and the method includes receiving, by a forwarding apparatus, a first packet, where the first packet belongs to a first packet flow, the forwarding apparatus includes a first transmit port and a first memory coupled with the first transmit port, the first memory is configured to store the packets that is in the first packet flow and received by the forwarding apparatus, and the first transmit port is configured to send the packets that is in the first packet flow and stored in the first memory, determining, by the forwarding apparatus, at least two types of information in the following four types of information related to the first packet a duration of staying in the first memory by the first packet flow when the first packet is received, usage of the first memory when the first packet is received, whether the first packet flow is a victim of a congestion control mechanism when the first packet is received, where a class of service of the first packet flow is a first class of service, and when the forwarding apparatus receives a backpressure signal corresponding to the first class of service through the transmit port of the forwarding apparatus, the first packet flow is a victim of the congestion control mechanism, or when the forwarding apparatus does not receive a backpressure signal corresponding to the first class of service through the transmit port of the forwarding apparatus, the first packet flow is not a victim of the congestion control mechanism, and a drop priority of the first packet, where the drop priority of the first packet is determined based on a field used to indicate a scheduling priority in the first packet, or is determined based on protocol drop sensitivity of the first packet, determining, by the forwarding apparatus based on the at least two types of information related to the first packet, whether ECN marking needs to be performed on the first packet, and when determining that ECN marking needs to be performed on the first packet, performing, by the forwarding apparatus, ECN marking on the first packet.

In the foregoing technical solution, at least two types of information are used to determine whether ECN marking needs to be performed on a packet. Therefore, compared with a technical solution that uses only one type of information to determine whether ECN marking needs to be performed on a packet, the foregoing technical solution helps improve precision of performing ECN marking on the packet.

Optionally, the method further includes receiving, by the forwarding apparatus, a second packet, where the second packet belongs to a second packet flow, the forwarding apparatus includes a second transmit port and a second memory coupled with the second transmit port, the second memory is configured to store the packets that is in the second packet flow and received by the forwarding apparatus, and the second transmit port is configured to send the packets that is in the second packet flow and stored in the second memory, determining, by the forwarding apparatus, at least two types of information in the following four types of information related to the second packet a duration of staying in the second memory by the second packet flow when the second packet is received, usage of the second memory when the second packet is received, whether the second packet flow is a victim of the congestion control mechanism when the second packet is received, where a class of service of the second packet flow is a second class of service, and when the forwarding apparatus receives a backpressure signal corresponding to the second class of service through a receive port of the forwarding apparatus, the second packet flow is a victim of the congestion control mechanism, or when the forwarding apparatus does not receive a backpressure signal corresponding to the second class of service through the transmit port of the forwarding apparatus, the second packet flow is not a victim of the congestion control mechanism, and a drop priority of the second packet, where the drop priority of the second packet is determined based on a field used to indicate a scheduling priority in the second packet, or is determined based on protocol drop sensitivity of the second packet, when the duration of staying in the first memory by the first packet flow is longer than the duration of staying in the second memory by the second packet flow, and at least one of the following three conditions is satisfied, determining, by the forwarding apparatus, that a probability of ECN marking of the first packet is higher than a probability of ECN marking of the second packet the usage of the first memory is equal to the usage of the second memory, the first packet flow and the second packet flow are victims of the congestion control mechanism, and the drop priority of the first packet is equal to the drop priority of the second packet, or when the usage of the first memory is higher than the usage of the second memory, and at least one of the following three conditions is satisfied, determining, by the forwarding apparatus, that a probability of ECN marking of the first packet is higher than a probability of ECN marking of the second packet the duration of staying in the first memory by the first packet flow is equal to the duration of staying in the second memory by the second packet flow, the first packet flow and the second packet flow are victims of the congestion control mechanism, and the drop priority of the first packet is equal to the drop priority of the second packet, or when the first packet flow is a victim of the congestion control mechanism and the second packet flow is not a victim of the congestion control mechanism, and at least one of the following three conditions is satisfied, determining, by the forwarding apparatus, that a probability of ECN marking of the first packet is lower than a probability of ECN marking of the second packet the duration of staying in the first memory by the first packet flow is equal to the duration of staying in the second memory by the second packet flow, the usage of the first memory is equal to the usage of the second memory, and the drop priority of the first packet is equal to the drop priority of the second packet, or when the drop priority of the first packet is lower than the drop priority of the second packet, and at least one of the following three conditions is satisfied, determining, by the forwarding apparatus, that a probability of ECN marking of the first packet is lower than a probability of ECN marking of the second packet a transmission rate of sending the first packet flow by the forwarding apparatus through the first transmit port is equal to a transmission rate of sending the second packet flow by the forwarding apparatus through the second transmit port, the usage of the first memory is equal to the usage of the second memory, and the first packet flow and the second packet flow are victims of the congestion control mechanism, and on a basis that the probability of ECN marking of the first packet is lower than the probability of ECN marking of the second packet, performing, by the forwarding apparatus, ECN marking on the second packet, and avoiding performing ECN marking on the first packet.

In the foregoing technical solution, an attribute of the first packet flow is different from that of the second packet flow, or an attribute of the first packet is different from an attribute of the second packet. For different cases, in the foregoing technical solution, different processing is performed on the first packet and the second packet. This helps reduce a congestion degree of the packet flow. Alternatively, this helps meet service requirements of different packet flows and implement more balanced service processing.

Optionally, when the forwarding apparatus determines that ECN marking does not need to be performed on the first packet, the method further includes determining, by the forwarding apparatus based on the at least two types of information related to the first packet, whether the first packet needs to be dropped, and when the forwarding apparatus determines that the first packet does not need to be dropped, storing, by the forwarding apparatus, the first packet in the first memory.

Optionally, in the foregoing technical solution, the determining, by the forwarding apparatus based on the at least two types of information related to the first packet, whether ECN marking needs to be performed on the first packet includes determining, by the forwarding apparatus, a weighted random early detection (WRED) algorithm based on the at least two types of information related to the first packet, and determining, by the forwarding apparatus according to the WRED algorithm, whether ECN marking needs to be performed on the first packet.

Optionally, in the foregoing technical solution, the field used to indicate the scheduling priority in the first packet is an experimental bit (EXP) field in a multiprotocol label switching (MPLS) label, a priority code point (PCP) field in a virtual local area network (VLAN) tag, or a differentiated services code point (DSCP) field in an Internet Protocol (IP) header.

According to a second aspect, a forwarding apparatus is provided, and the apparatus includes a receiving unit, a first determining unit, a second determining unit, and a processing unit, where the receiving unit is configured to receive a first packet, where the first packet belongs to a first packet flow, the forwarding apparatus includes a first transmit port and a first memory coupled with the first transmit port, the first memory is configured to store the packets that is in the first packet flow and received by the forwarding apparatus, and the first transmit port is configured to send the packets that is in the first packet flow and stored in the first memory, the first determining unit is configured to determine at least two types of information in the following four types of information related to the first packet a duration of staying in the first memory by the first packet flow when the first packet is received, usage of the first memory when the first packet is received, whether the first packet flow is a victim of a congestion control mechanism when the first packet is received, where a class of service of the first packet flow is a first class of service, and when the forwarding apparatus receives a backpressure signal corresponding to the first class of service through the transmit port of the forwarding apparatus, the first packet flow is a victim of the congestion control mechanism, or when the forwarding apparatus does not receive a backpressure signal corresponding to the first class of service through the transmit port of the forwarding apparatus, the first packet flow is not a victim of the congestion control mechanism, and a drop priority of the first packet, where the drop priority of the first packet is determined based on a field used to indicate a scheduling priority in the first packet, or is determined based on protocol drop sensitivity of the first packet, the second determining unit is configured to determine, based on the at least two types of information related to the first packet, whether ECN marking needs to be performed on the first packet, and the processing unit is configured to perform ECN marking on the first packet when it is determined that ECN marking needs to be performed on the first packet.

Optionally, in the foregoing solution, the receiving unit is further configured to receive a second packet, where the second packet belongs to a second packet flow, the forwarding apparatus includes a second transmit port and a second memory coupled with the second transmit port, the second memory is configured to store the packets that is in the second packet flow and received by the forwarding apparatus, and the second transmit port is configured to send the packets that is in the second packet flow and stored in the second memory, the first determining unit is further configured to determine at least two types of information in the following four types of information related to the second packet a duration of staying in the second memory by the second packet flow when the second packet is received, usage of the second memory when the second packet is received, indicated by the sixth information, whether the second packet flow is a victim of the congestion control mechanism when the second packet is received, where a class of service of the second packet flow is a second class of service, and when the forwarding apparatus receives a backpressure signal corresponding to the second class of service through a receive port of the forwarding apparatus, the second packet flow is a victim of the congestion control mechanism, or when the forwarding apparatus does not receive a backpressure signal corresponding to the second class of service through the transmit port of the forwarding apparatus, the second packet flow is not a victim of the congestion control mechanism, and a drop priority of the second packet, where the drop priority of the second packet is determined based on a field used to indicate a scheduling priority in the second packet, or is determined based on protocol drop sensitivity of the second packet, the second determining unit is further configured to, when the duration of staying in the first memory by the first packet flow is longer than the duration of staying in the second memory by the second packet flow, and at least one of the following three conditions is satisfied, determine that a probability of ECN marking of the first packet is higher than a probability of ECN marking of the second packet the usage of the first memory is equal to the usage of the second memory, the first packet flow and the second packet flow are victims of the congestion control mechanism, and the drop priority of the first packet is equal to the drop priority of the second packet, or when the usage of the first memory is higher than the usage of the second memory, and at least one of the following three conditions is satisfied, determine that a probability of ECN marking of the first packet is higher than a probability of ECN marking of the second packet the duration of staying in the first memory by the first packet flow is equal to the duration of staying in the second memory by the second packet flow, the first packet flow and the second packet flow are victims of the congestion control mechanism, and the drop priority of the first packet is equal to the drop priority of the second packet, or when the first packet flow is a victim of the congestion control mechanism and the second packet flow is not a victim of the congestion control mechanism, and at least one of the following three conditions is satisfied, determine that a probability of ECN marking of the first packet is lower than a probability of ECN marking of the second packet the duration of staying in the first memory by the first packet flow is equal to the duration of staying in the second memory by the second packet flow, the usage of the first memory is equal to the usage of the second memory, and the drop priority of the first packet is equal to the drop priority of the second packet, or when the drop priority of the first packet is lower than the drop priority of the second packet, and at least one of the following three conditions is satisfied, determine that a probability of ECN marking of the first packet is lower than a probability of ECN marking of the second packet the duration of staying in the first memory by the first packet flow is equal to the duration of staying in the second memory by the second packet flow, the usage of the first memory is equal to the usage of the second memory, and the first packet flow and the second packet flow are victims of the congestion control mechanism, and the processing unit is further configured to on a basis that the probability of ECN marking of the first packet is lower than the probability of ECN marking of the second packet, perform ECN marking on the second packet, and avoid performing ECN marking on the first packet.

Optionally, in the foregoing technical solution, when the second determining unit determines that ECN marking does not need to be performed on the first packet, the second determining unit is further configured to determine, based on the at least two types of information related to the first packet, whether the first packet needs to be dropped, and the processing unit is further configured to store the first packet in the first memory when the second determining unit determines that the first packet does not need to be dropped.

Optionally, in the foregoing technical solution, the first determining unit is configured to determine a WRED algorithm based on the at least two types of information related to the first packet, and determine, according to the WRED algorithm, whether ECN marking needs to be performed on the first packet.

Optionally, in the foregoing technical solution, the field used to indicate the scheduling priority in the first packet is an EXP field in a MPLS label, a PCP field in a VLAN tag, or a DSCP field in an IP header.

According to a third aspect, a forwarding apparatus is provided, and the forwarding apparatus includes a transceiver, a processor, and a memory, where the transceiver is coupled with the processor, the memory is coupled with the processor, and the memory stores a computer program, the transceiver is configured to receive a first packet, where the first packet belongs to a first packet flow, the forwarding apparatus includes a first transmit port and a first memory coupled with the first transmit port, the first memory is configured to store the packets that is in the first packet flow and received by the forwarding apparatus, and the first transmit port is configured to send the packets that is in the first packet flow and stored in the first memory, and the processor executes the computer program to perform the method provided by the first aspect.

In addition, the forwarding apparatus provided by the third aspect may be configured to implement the forwarding apparatus provided by the second aspect. Further, the transceiver is configured to implement the receiving unit in the second aspect. The processor is configured to implement the first determining unit, the second determining unit, and the processing unit in the second aspect.

According to a fourth aspect, a packet processing method is provided, and the method includes receiving, by a forwarding apparatus, a first packet, where the first packet belongs to a first packet flow, the forwarding apparatus includes a first transmit port and a first memory coupled with the first transmit port, the first memory is configured to store the packets that is in the first packet flow and received by the forwarding apparatus, and the first transmit port is configured to send the packets that is in the first packet flow and stored in the first memory, determining, by the forwarding apparatus, at least two types of information in the following four types of information related to the first packet a duration of staying in the first memory by the first packet flow when the first packet is received, usage of the first memory when the first packet is received, whether the first packet flow is a victim of a congestion control mechanism when the first packet is received, where a class of service of the first packet flow is a first class of service, and when the forwarding apparatus receives a backpressure signal corresponding to the first class of service through the transmit port of the forwarding apparatus, the first packet flow is a victim of the congestion control mechanism, or when the forwarding apparatus does not receive a backpressure signal corresponding to the first class of service through the transmit port of the forwarding apparatus, the first packet flow is not a victim of the congestion control mechanism, and a drop priority of the first packet, where the drop priority of the first packet is determined based on a field used to indicate a scheduling priority in the first packet, or is determined based on protocol drop sensitivity of the first packet, determining, by the forwarding apparatus based on the at least two types of information related to the first packet, whether the first packet needs to be dropped, and when determining that the first packet does not need to be dropped, storing, by the forwarding apparatus, the first packet in the first memory.

Optionally, in the foregoing technical solution, the method further includes receiving, by the forwarding apparatus, a second packet, where the second packet belongs to a second packet flow, the forwarding apparatus includes a second transmit port and a second memory coupled with the second transmit port, the second memory is configured to store the packets that is in the second packet flow and received by the forwarding apparatus, and the second transmit port is configured to send the packets that is in the second packet flow and stored in the second memory, determining, by the forwarding apparatus, at least two types of information in the following four types of information related to the second packet a duration of staying in the second memory by the second packet flow when the second packet is received, usage of the second memory when the second packet is received, indicated by the sixth information, whether the second packet flow is a victim of the congestion control mechanism when the second packet is received, where a class of service of the second packet flow is a second class of service, and when the forwarding apparatus receives a backpressure signal corresponding to the second class of service through a receive port of the forwarding apparatus, the second packet flow is a victim of the congestion control mechanism, or when the forwarding apparatus does not receive a backpressure signal corresponding to the second class of service through the transmit port of the forwarding apparatus, the second packet flow is not a victim of the congestion control mechanism, and a drop priority of the second packet, where the drop priority of the second packet is determined based on a field used to indicate a scheduling priority in the second packet, or is determined based on protocol drop sensitivity of the second packet, when the duration of staying in the first memory by the first packet flow is longer than the duration of staying in the second memory by the second packet flow, and at least one of the following three conditions is satisfied, determining, by the forwarding apparatus, that a drop probability of the first packet is higher than a drop probability of the second packet the usage of the first memory is equal to the usage of the second memory, the first packet flow and the second packet flow are victims of the congestion control mechanism, and the drop priority of the first packet is equal to the drop priority of the second packet, or when the usage of the first memory is higher than the usage of the second memory, and at least one of the following three conditions is satisfied, determining, by the forwarding apparatus, that a drop probability of the first packet is higher than a drop probability of the second packet the duration of staying in the first memory by the first packet flow is equal to the duration of staying in the second memory by the second packet flow, the first packet flow and the second packet flow are victims of the congestion control mechanism, and the drop priority of the first packet is equal to the drop priority of the second packet, or when the first packet flow is a victim of the congestion control mechanism and the second packet flow is not a victim of the congestion control mechanism, and at least one of the following three conditions is satisfied, determining, by the forwarding apparatus, that a drop probability of the first packet is lower than a drop probability of the second packet the duration of staying in the first memory by the first packet flow is equal to the duration of staying in the second memory by the second packet flow, the usage of the first memory is equal to the usage of the second memory, and the drop priority of the first packet is equal to the drop priority of the second packet, or when the drop priority of the first packet is lower than the drop priority of the second packet, and at least one of the following three conditions is satisfied, determining, by the forwarding apparatus, that a drop probability of the first packet is lower than a drop probability of the second packet a transmission rate of sending the first packet flow by the forwarding apparatus through the first transmit port is equal to a transmission rate of sending the second packet flow by the forwarding apparatus through the second transmit port, the usage of the first memory is equal to the usage of the second memory, and the first packet flow and the second packet flow are victims of the congestion control mechanism, and on a basis that the drop probability of the first packet is lower than the drop probability of the second packet, storing, by the forwarding apparatus, the first packet in the first memory, and avoiding storing the second packet in the second memory.

Optionally, in the foregoing technical solution, after the determining, by the forwarding apparatus, at least two types of information related to the first packet, and before the determining, by the forwarding apparatus based on the at least two types of information related to the first packet, whether the first packet needs to be dropped, the method further includes determining, by the forwarding apparatus based on the at least two types of information related to the first packet, that ECN marking does not need to be performed on the first packet.

According to a fifth aspect, a forwarding apparatus is provided, and the apparatus includes a receiving unit, a first determining unit, a second determining unit, and a processing unit, where the receiving unit is configured to receive a first packet, where the first packet belongs to a first packet flow, the forwarding apparatus includes a first transmit port and a first memory coupled with the first transmit port, the first memory is configured to store the packets that is in the first packet flow and received by the forwarding apparatus, and the first transmit port is configured to send the packets that is in the first packet flow and stored in the first memory, the first determining unit is configured to determine at least two types of information in the following four types of information related to the first packet a duration of staying in the first memory by the first packet flow when the first packet is received, usage of the first memory when the first packet is received, whether the first packet flow is a victim of a congestion control mechanism when the first packet is received, where a class of service of the first packet flow is a first class of service, and when the forwarding apparatus receives a backpressure signal corresponding to the first class of service through the transmit port of the forwarding apparatus, the first packet flow is a victim of the congestion control mechanism, or when the forwarding apparatus does not receive a backpressure signal corresponding to the first class of service through the transmit port of the forwarding apparatus, the first packet flow is not a victim of the congestion control mechanism, and a drop priority of the first packet, where the drop priority of the first packet is determined based on a field used to indicate a scheduling priority in the first packet, or is determined based on protocol drop sensitivity of the first packet, the second determining unit is configured to determine, based on the at least two types of information related to the first packet, whether the first packet needs to be dropped, and the processing unit is configured to store the first packet in the first memory when it is determined that the first packet does not need to be dropped.

Optionally, in the foregoing solution, the receiving unit is further configured to receive a second packet, where the second packet belongs to a second packet flow, the forwarding apparatus includes a second transmit port and a second memory coupled with the second transmit port, the second memory is configured to store the packets that is in the second packet flow and received by the forwarding apparatus, and the second transmit port is configured to send the packets that is in the second packet flow and stored in the second memory, the first determining unit is further configured to determine at least two types of information in the following four types of information related to the second packet a duration of staying in the second memory by the second packet flow when the second packet is received, usage of the second memory when the second packet is received, indicated by the sixth information, whether the second packet flow is a victim of the congestion control mechanism when the second packet is received, where a class of service of the second packet flow is a second class of service, and when the forwarding apparatus receives a backpressure signal corresponding to the second class of service through a receive port of the forwarding apparatus, the second packet flow is a victim of the congestion control mechanism, or when the forwarding apparatus does not receive a backpressure signal corresponding to the second class of service through the transmit port of the forwarding apparatus, the second packet flow is not a victim of the congestion control mechanism, and a drop priority of the second packet, where the drop priority of the second packet is determined based on a field used to indicate a scheduling priority in the second packet, or is determined based on protocol drop sensitivity of the second packet, the second determining unit is further configured to, when the duration of staying in the first memory by the first packet flow is longer than the duration of staying in the second memory by the second packet flow, and at least one of the following three conditions is satisfied, determine that a drop probability of the first packet is higher than a drop probability of the second packet the usage of the first memory is equal to the usage of the second memory, the first packet flow and the second packet flow are victims of the congestion control mechanism, and the drop priority of the first packet is equal to the drop priority of the second packet, or when the usage of the first memory is higher than the usage of the second memory, and at least one of the following three conditions is satisfied, determine that a drop probability of the first packet is higher than a drop probability of the second packet the duration of staying in the first memory by the first packet flow is equal to the duration of staying in the second memory by the second packet flow, the first packet flow and the second packet flow are victims of the congestion control mechanism, and the drop priority of the first packet is equal to the drop priority of the second packet, or when the first packet flow is a victim of the congestion control mechanism and the second packet flow is not a victim of the congestion control mechanism, and at least one of the following three conditions is satisfied, determine that a drop probability of the first packet is lower than a drop probability of the second packet the duration of staying in the first memory by the first packet flow is equal to the duration of staying in the second memory by the second packet flow, the usage of the first memory is equal to the usage of the second memory, and the drop priority of the first packet is equal to the drop priority of the second packet, or when the drop priority of the first packet is lower than the drop priority of the second packet, and at least one of the following three conditions is satisfied, determine that a drop probability of the first packet is lower than a drop probability of the second packet a transmission rate of sending the first packet flow by the forwarding apparatus through the first transmit port is equal to a transmission rate of sending the second packet flow by the forwarding apparatus through the second transmit port, the usage of the first memory is equal to the usage of the second memory, and the first packet flow and the second packet flow are victims of the congestion control mechanism, and the processing unit is further configured to on a basis that the drop probability of the first packet is lower than the drop probability of the second packet, store the first packet in the first memory, and avoid storing the second packet in the second memory.

Optionally, in the foregoing technical solution, after the first determining unit determines the at least two types of information related to the first packet, and before the second determining unit determines, based on the at least two types of information related to the first packet, whether the first packet needs to be dropped, the second determining unit is further configured to determine, based on the at least two types of information related to the first packet, that ECN marking does not need to be performed on the first packet.

According to a sixth aspect, a forwarding apparatus is provided, and the forwarding apparatus includes a transceiver, a processor, and a memory, where the transceiver is coupled with the processor, the memory is coupled with the processor, and the memory stores a computer program, the transceiver is configured to receive a first packet, where the first packet belongs to a first packet flow, the forwarding apparatus includes a first transmit port and a first memory coupled with the first transmit port, the first memory is configured to store the packets that is in the first packet flow and received by the forwarding apparatus, and the first transmit port is configured to send the packets that is in the first packet flow and stored in the first memory, and the processor executes the computer program to perform the method provided by the fourth aspect.

In addition, the forwarding apparatus provided by the sixth aspect may be configured to implement the forwarding apparatus provided by the fifth aspect. Further, the transceiver is configured to implement the receiving unit in the fifth aspect. The processor is configured to implement the first determining unit, the second determining unit, and the processing unit in the fifth aspect.

BRIEF DESCRIPTION OF DRAWINGS

To describe the technical solutions in the embodiments of this application more clearly, the following briefly describes accompanying drawings used in the description of the embodiments. Apparently, the accompanying drawings in the following description merely show some embodiments of this application, and a person of ordinary skill in the art can derive other drawings from these accompanying drawings without creative efforts.

DESCRIPTION OF EMBODIMENTS

In the data communications field, a packet may arrive at a destination only after being forwarded by a plurality of forwarding apparatuses. The forwarding apparatus may be a router. The router may forward an IP packet. The forwarding apparatus may be a network switch. The network switch may forward an Ethernet frame.

Figure 1:
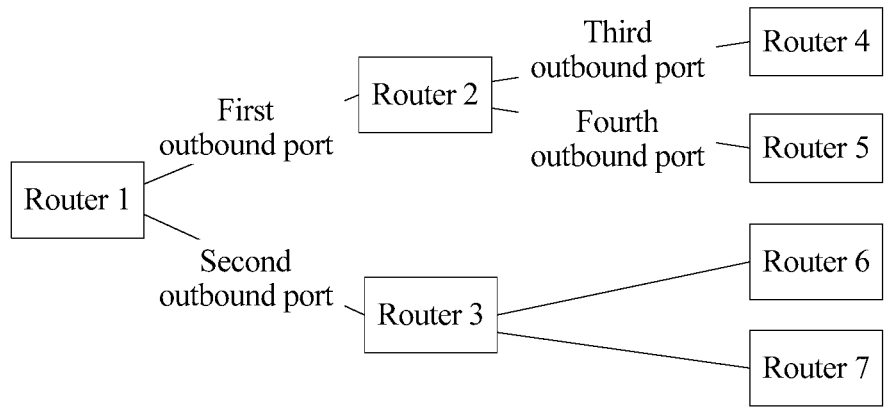
FIG. 1 is a networking agriculture diagram according to this application.

FIG. 1 is a networking agriculture diagram according to this application. Referring to FIG. 1, the networking agriculture diagram includes seven routers a router 1 to a router 7. Each router may include a plurality of physical interface cards (PIC). The PIC may also be referred to as a network interface card (NIC). Each physical interface card may include a plurality of ports. For example, a physical interface card may include eight Gigabit Ethernet (GE) ports. A bandwidth of each GE port is 1 Gigabit per second. FIG. 1 shows two outbound ports (a first outbound port and a second outbound port) in the router 1, and two outbound ports (a third outbound port and a fourth outbound port) in the router 2. The router 1 is connected to the router 2 using the first outbound port. The router 1 is connected to the router 3 using the second outbound port. The router 2 is connected to the router 4 using the third outbound port. The router 2 is connected to the router 5 using the fourth outbound port.

After receiving a packet, the router 1 determines an outbound port used to forward the packet, for example, the first outbound port, and forwards the packet from the first outbound port. After receiving the packet forwarded by the router 1, the router 2 determines an outbound port used to forward the packet, for example, the third outbound port, and forwards the packet from the third outbound port.

Figure 2:
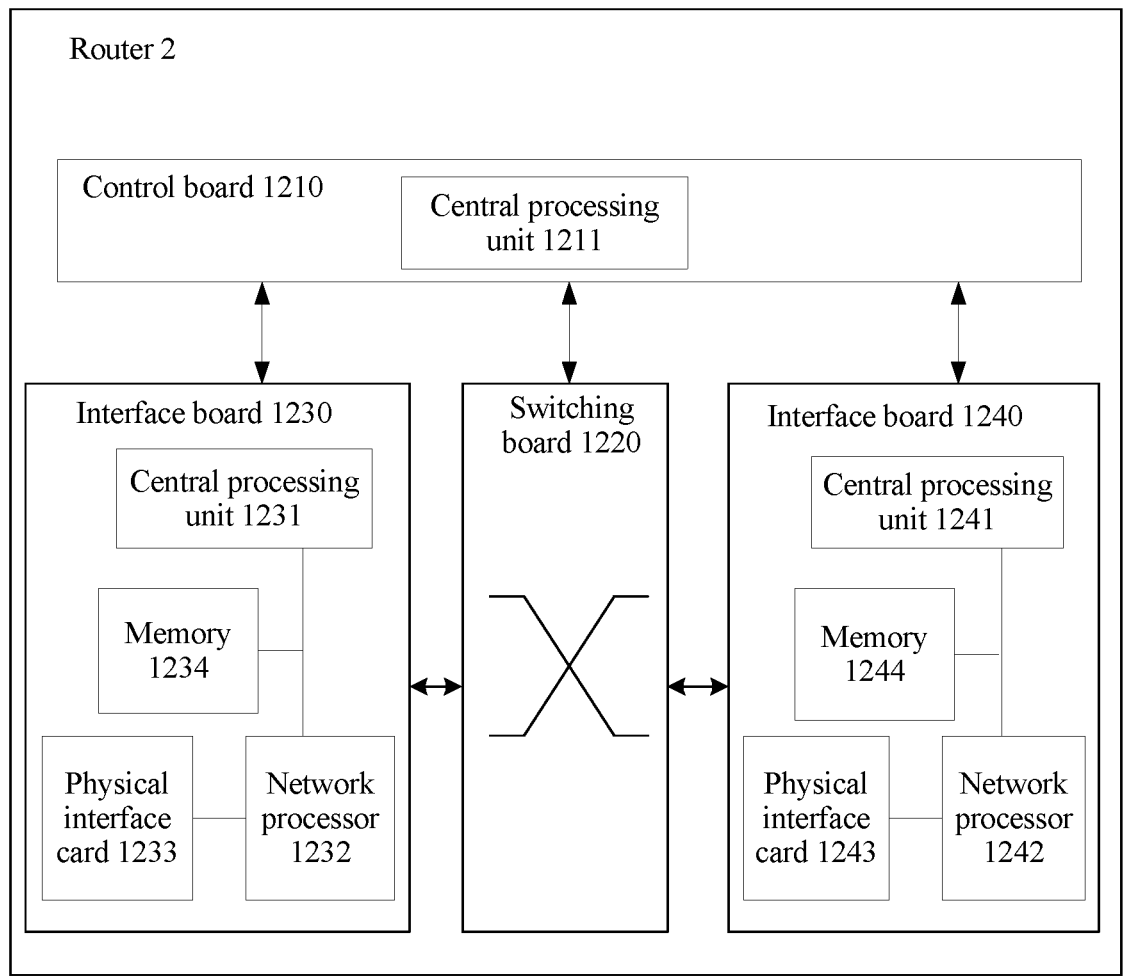
FIG. 2 is a schematic structural diagram of a router according to this application.

FIG. 2 is a schematic structural diagram of a router 2 in FIG. 1 in embodiments. Other routers (for example, the router 1) in FIG. 1 may also use the structure shown in FIG. 2.

Referring to FIG. 2, the router 2 includes a control board 1210, a switching board 1220, an interface board 1230, and an interface board 1240. The control board 1210 includes a central processing unit 1211. The control board 1210 may be configured to execute a routing protocol. The routing protocol may be the Border Gateway Protocol (BGP) or the Interior Gateway Protocol (IGP). The control board 1210 may generate a routing table by executing a routing protocol, and send the routing table to the interface boards 1230 and 1240. It should be noted that, the router 2 in FIG. 1 may also use a structure different from the structure shown in FIG. 2. For example, the router 2 in FIG. 1 may include only a control board and an interface board, and does not include a switching board. Certainly, the router 2 in FIG. 1 may include more than two interface boards. When the router 2 includes only one interface board and does not include a switching board, after an IP packet received by an inbound port of the interface board is processed by the interface board, the IP packet may be sent from an outbound port of the interface board. When the router 2 includes a plurality of interface boards and includes a switching board, after an IP packet received by an inbound port of an interface board of the router 2 is processed by the switching board, the IP packet may be sent from an outbound port of another interface board of the router 2. This application does not limit specific structures of the router 2 and other routers in FIG. 1.

The interface board 1230 may forward the IP packet by searching the routing table. Further, the interface board 1230 includes a central processing unit 1231, a network processor 1232, a physical interface card 1233, and a memory 1234. It should be noted that, FIG. 2 does not show all components that can be included in the interface board 1230. In a specific implementation, the interface board 1230 may further include other components. For example, to enable the interface board 1230 to have a function of queue scheduling and management, the interface board 1230 may further include a traffic manager. In addition, to enable a packet from the interface board 1230 to be switched from the switching board 1220 to the interface board 1240, the interface board 1230 may further include an ingress fabric interface chip (iFIC). For a specific implementation of the interface board 1230 including the traffic manager and the iFIC, refer to FIG. 3 and corresponding descriptions. The central processing unit 1231 may receive the routing table sent by the central processing unit 1211, and store the routing table in the memory 1234. The physical interface card 1233 may be configured to receive an IP packet sent by the router 1. The network processor 1232 may search the routing table in the memory 1234 for a routing entry matching the IP packet received by the physical interface card 1233, and send the IP packet to the switching board 1220 according to the matched routing entry. The switching board 1220 may be configured to switch an IP packet from one interface board to another interface board. For example, the switching board 1220 may switch the IP packet from the interface board 1230 to the interface board 1240. Specifically, the switching board 1220 may switch the IP packet from the interface board 1230 to the interface board 1240 in a manner of cell switching. For example, the network processor 1232 may obtain a destination IP address in the IP packet. The network processor 1232 may search, according to a longest prefix match algorithm, the routing table for the routing entry matching the IP packet, and determine an outbound port according to the routing entry matching the IP packet. The routing entry matching the IP packet includes an identifier of the outbound port. Before the IP packet sent by the network processor 1232 to the switching board 1220 arrives at the switching board 1220, the interface board 1230 may perform queue scheduling and management on the IP packet. Specifically, the interface board 1230 may perform queue scheduling and management on the IP packet using a traffic manager 301 in FIG. 3.

The interface board 1240 may forward the IP packet by searching the routing table. The interface board 1240 includes a central processing unit 1241, a network processor 1242, a physical interface card 1243, and a memory 1244. FIG. 2 does not show all components that can be included in the interface board 1240. In a specific implementation, the interface board 1240 may further include other components. For example, to enable the interface board 1240 to have a function of queue scheduling and management, the interface board 1240 may further include a traffic manager. In addition, to enable the interface board 1240 to correctly receive a packet from the interface board 1230 through the switching board 1220, the interface board 1240 may further include an egress fabric interface chip (eFIC). For a specific implementation of the interface board 1240 including the traffic manager and the eFIC, refer to FIG. 4 and corresponding descriptions. The central processing unit 1241 may receive the routing table sent by the central processing unit 1211, and store the routing table in the memory 1244. The network processor 1242 may be configured to receive an IP packet from the switching board 1220. The IP packet from the switching board 1220 may be an IP packet sent by the router 1 and received by the physical interface card 1233. The network processor 1242 may search the routing table in the memory 1244 for a routing entry matching the IP packet from the switching board 1220, and send the IP packet to the physical interface card 1243 according to the matched routing entry. The physical interface card 1243 may be configured to send the IP packet to the router 4. Before the IP packet sent by the network processor 1242 to the physical interface card 1243 arrives at the physical interface card 1243, the interface board 1240 may perform queue scheduling and management on the IP packet. Specifically, the interface board 1240 may perform queue scheduling and management on the IP packet using a traffic manager 402 in FIG. 4.

A plurality of packets need to be transmitted in a network, and a time of sending each packet may be different. To reduce disorder of packets transmitted in the network, a router includes a memory. The memory may be a first in first out memory. The router may use the memory to perform queue scheduling and management on a to-be-forwarded packet. In addition, the router may receive a large quantity of packets within a short time, and the large quantity of packets may cause a congestion degree of a first in first out queue in the memory of the router to be relatively high. To reduce the congestion degree of the first in first out queue, the router may perform drop management on a packet to be enqueued to the first in first out queue.

Figure 3:
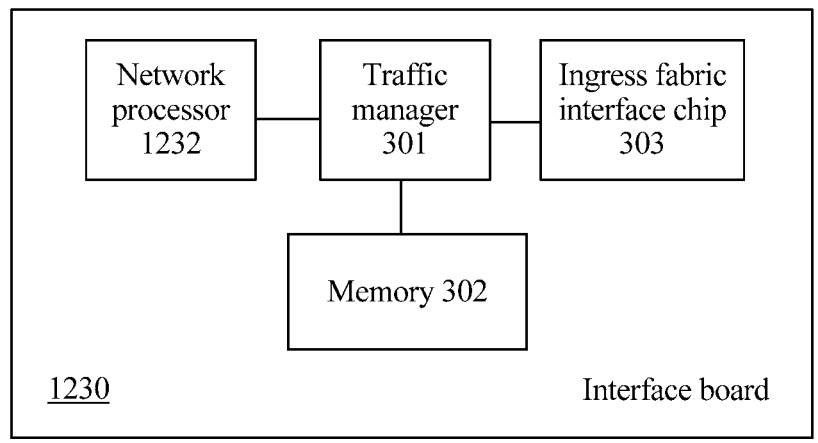
FIG. 3 is a schematic structural diagram of an interface board according to this application.

FIG. 3 is a schematic structural diagram of the interface board 1230 shown in FIG. 2 in a possible implementation. Referring to FIG. 3, the interface board 1230 includes the network processor 1232, the traffic manager 301, a memory 302, and an iFIC 303. It should be noted that, FIG. 3 shows only some components included in the interface board 1230. In a specific implementation, the interface board 1230 shown in FIG. 3 may further include a component in the interface board 1230 shown in FIG. 2. The interface board shown in FIG. 3 can perform queue scheduling and management on upstream traffic. The upstream traffic may be traffic that is received by the interface board 1230 through the physical interface card 1233 and is to be sent to the switching board 1220. Specifically, after a packet received through the physical interface card 1233 is processed by the network processor 1232 and the traffic manager 301, the packet is sent to the iFIC 303. After receiving the packet sent by the traffic manager 301, the iFIC 303 may generate a plurality of cells according to the packet, and send the plurality of cells to the switching board 1220. The packet queue may be a first in first out queue. The memory 302 may be a first in first out memory. It should be noted that, functions of the memory 1234 and the memory 302 are different. The memory 1234 is configured to store a routing table. The network processor searches the routing table by accessing the memory 1234. The memory 302 is configured to store the first in first out queue. The traffic manager 301 manages the first in first out queue by accessing the memory 302. Therefore, the memory 1234 and the memory 302 may be relatively independent memories. Further, the memory 302 is configured to store and maintain a packet queue. The packet queue includes a plurality of packets. The traffic manager 301 can perform enqueue management on a packet that is to enter the packet queue, and perform dequeue management on a packet that is to leave the packet queue. Further, the traffic manager 301 can store and maintain a packet descriptor queue. The packet descriptor queue includes a plurality of packet descriptors. The plurality of packets included in the packet queue correspond to the plurality of packet descriptors included in the packet descriptor queue on a one-to-one basis. Each packet descriptor is used to indicate information related to a corresponding packet. For example, the packet descriptor may include a storage location of the packet corresponding to the packet descriptor in the memory 302. In addition, the packet descriptor may further include a time of entering the router 2 by the packet corresponding to the packet descriptor. Specifically, the time of entering the router 2 by the packet corresponding to the packet descriptor may be a time of receiving the packet corresponding to the packet descriptor by the physical interface card 1233. The traffic manager 301 can perform enqueue management on the packet from the network processor 1232. For example, the traffic manager 301 may determine, according to a WRED algorithm, whether to drop the packet from the network processor 1232. The WRED algorithm defines a maximum queue threshold and a minimum queue threshold. Alternatively, the traffic manager 301 may determine, according to the WRED algorithm, whether to perform ECN marking on the packet from the network processor 1232. For ECN marking, refer to descriptions in request for comments (RFC) 3168 published by the Internet Engineering Task Force (IETF), where content of a related part in the document is incorporated in this specification by reference in its entirety. Herein for brevity, details are not further described. Certainly, the traffic manager 301 may also determine, according to another algorithm, whether to drop the packet from the network processor 1232. If the traffic manager 301 determines not to drop the packet from the network processor 1232, the traffic manager 301 may store the packet in the packet queue of the memory 302. Further, the traffic manager 301 may store the packet in a tail of the packet queue of the memory 302. In addition, the traffic manager 301 generates, according to the storage location of the packet in the memory 302, a packet descriptor corresponding to the packet, and stores the packet descriptor in the packet descriptor queue. Further, the traffic manager 301 may store the packet descriptor in a tail of the packet descriptor queue. The packet descriptor queue may be stored in the traffic manager 301. Further, the packet descriptor queue may be stored in a queue manager in the traffic manager. For details, refer to FIG. 6 and descriptions about an embodiment in FIG. 6. The traffic manager 301 can perform dequeue management on the packet queue stored in the memory 302. For example, when the traffic manager 301 determines, according to weighted fair queuing (WFQ), that a packet in the packet queue stored in the memory 302 needs to be sent, the traffic manager 301 may send a scheduling signal to the memory 302 according to a head of the packet descriptor queue. Certainly, the traffic manager 301 may also determine, according to another queue scheduling algorithm, that the packet in the packet queue stored in the memory 302 needs to be sent. The scheduling signal includes a storage location of the packet in a head of the packet queue. The scheduling signal is used to instruct the memory 302 to provide the packet located in the head of the packet queue to the traffic manager 301. The memory 302 provides the packet located in the head of the packet queue to the traffic manager 301 and deletes the sent packet from the packet queue. The traffic manager 301 obtains, from the memory 302, the packet located in the head of the packet queue, and sends the packet to the iFIC 303. After the traffic manager 301 sends the packet to the iFIC 303, the traffic manager 301 deletes, from the packet descriptor queue, a packet descriptor corresponding to the sent packet.

Figure 4:
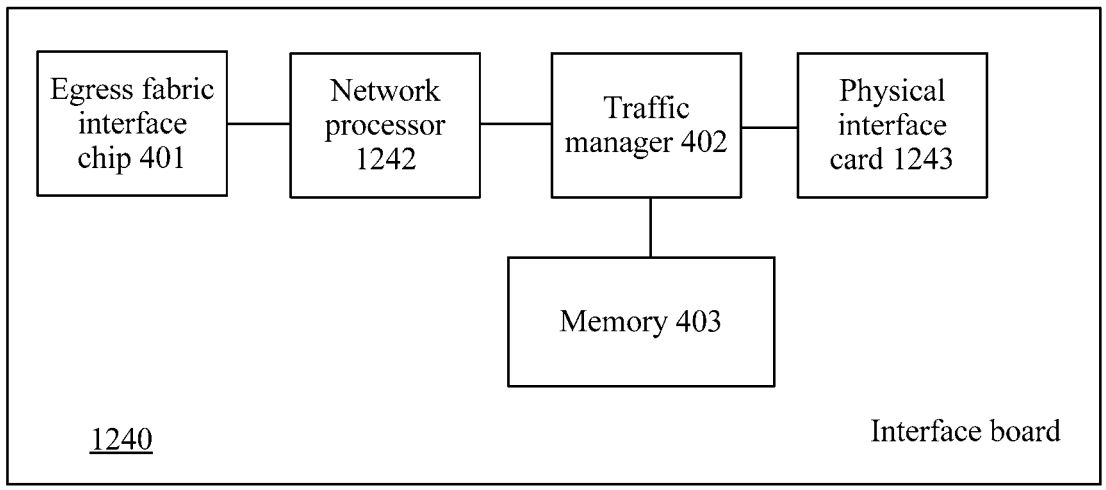
FIG. 4 is a schematic structural diagram of an interface board according to this application.

FIG. 4 is a schematic structural diagram of the interface board 1240 shown in FIG. 2 in a possible implementation. Referring to FIG. 4, the interface board 1240 includes the network processor 1242, the traffic manager 402, a memory 403, the physical interface card 1243, and an eFIC 401. It should be noted that, FIG. 4 shows only some components included in the interface board 1240. In a specific implementation, the interface board 1240 shown in FIG. 4 may further include a component in the interface board 1240 shown in FIG. 2. The interface board shown in FIG. 4 can perform queue scheduling and management on downstream traffic. The downstream traffic may be traffic that is received by the interface board 1240 through the switching board 1220 and is to be sent to the physical interface card 1243. After receiving the downstream traffic, the physical interface card 1243 may send the downstream traffic to the router 4 through the third outbound port. After receiving a plurality of information elements from the switching board 1220, the eFIC 401 can generate a packet according to the plurality of cells, and send the packet to the network processor 1242. The traffic manager 402 may perform drop management on the packet received by the network processor 1242. The traffic manager 402 may perform enqueue management on the packet received by the network processor 1242, and the network processor 1242 places the received packet in a packet queue of the memory 403 according to scheduling of the traffic manager and according to a scheduling algorithm, for example, in a tail of the packet queue. The traffic manager 402 may perform dequeue management on the packet queue stored in the memory 403. The packet queue may be a first in first out queue. The memory 403 may be a first in first out memory. The network processor 1242 and the memory 403 may be integrated in a chip. Alternatively, the network processor 1242 and the memory 403 may correspond to different chips. After the traffic manager 402 obtains the packet in the packet queue stored in the memory 403, the traffic manager 402 may send the obtained packet to the physical interface card 1243. The physical interface card 1243 may send the packet to the router 4 through the third outbound port. For a specific implementation of performing queue scheduling and management by the interface board shown in FIG. 4, refer to descriptions about the embodiment corresponding to FIG. 3. Details are not further described herein.

Figure 5:
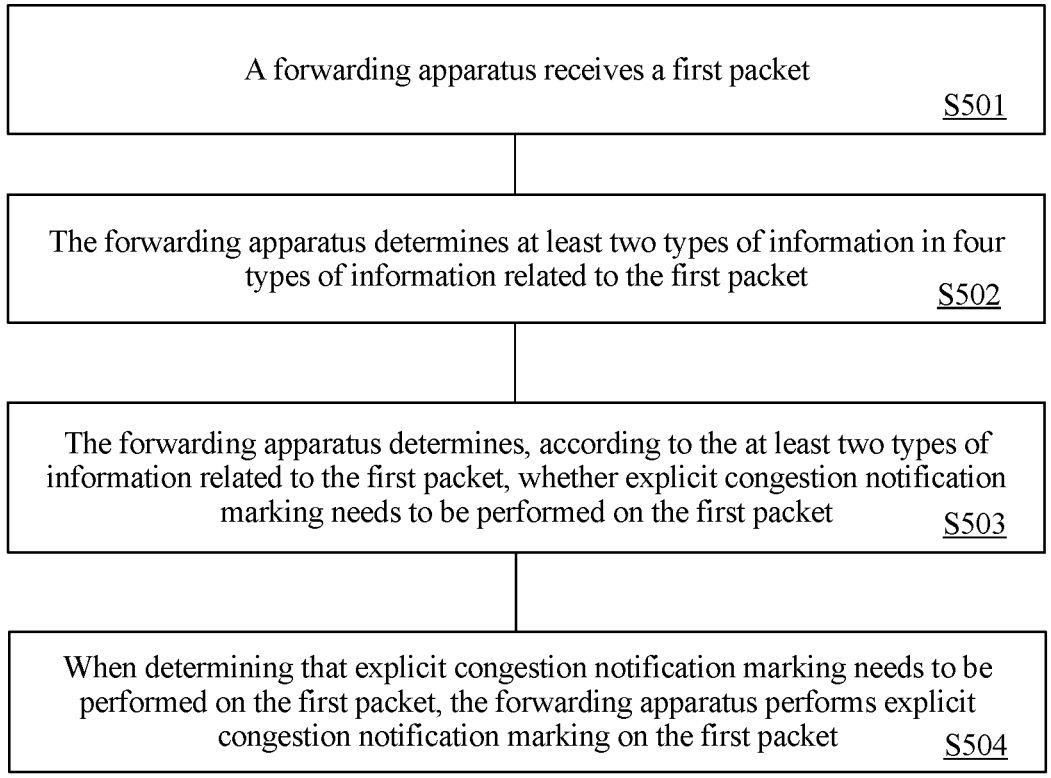
FIG. 5 is a schematic flowchart of a packet processing method according to this application.

FIG. 5 is a schematic flowchart of a packet processing method according to this disclosure. Referring to FIG. 5, the method includes S501, S502, S503, and S504. The method shown in FIG. 5 is performed by a forwarding apparatus. For example, the forwarding apparatus may be a traffic manager. The traffic manager may be a component in a network apparatus. For example, the network apparatus may be a router, a network switch, a firewall, or a load balancer. Specifically, the method shown in FIG. 5 may be performed by the traffic manager 402 shown in FIG. 4. The traffic manager 402 may be located on the interface board 1230 or the interface 1240.

S501. A Forwarding Apparatus Receives a First Packet.

For example, the forwarding apparatus may be a network apparatus. The network apparatus may include a plurality of receive ports. Each receive port may be an Ethernet port. Referring to FIG. 2, the forwarding apparatus may be the router 2 shown in FIG. 2. The physical interface card 1243 may include a plurality of Ethernet ports. The plurality of receive ports may be a plurality of Ethernet ports included in the physical interface card 1243. The forwarding apparatus may receive the first packet through a receive port in the plurality of receive ports. The first packet may be sent or forwarded by an upstream apparatus of the forwarding apparatus. For example, the forwarding apparatus and the upstream apparatus may be located in a same autonomous system (AS). The forwarding apparatus and the upstream apparatus are two peers. A BGP session is set up between the forwarding apparatus and the upstream apparatus. The forwarding apparatus uses the BGP session to receive the first packet from the upstream apparatus.

For example, a traffic manager located in the network apparatus may be connected to a plurality of receive ports and a plurality of transmit ports of the network apparatus. For example, each transmit port may be a GE port. Each receive port may be a GE port. The traffic manager includes a transceiver. The traffic manager may receive a packet from a receive port of the network apparatus through the transceiver. After receiving the packet, the traffic manager may store the packet in a first memory. The traffic manager may send the packet stored in the first memory to a transmit port of the network apparatus through the transceiver. Referring to FIG. 4, the forwarding apparatus may be the traffic manager 402 shown in FIG. 4. The traffic manager 402 may include a plurality of transceivers (not shown in the figure). The traffic manager 402 may receive a packet from the network processor 1242 through a transceiver coupled with the network processor 1242. After receiving the packet from the network processor 1242, the traffic manager 402 may store the packet in the memory 403. In addition, the traffic manager 402 may send the packet stored in the memory 403 to the physical interface card 1243 through a transceiver coupled with the physical interface card 1243. The memory 403 may be a first in first out memory.

The first packet belongs to a first packet flow. The forwarding apparatus includes a first transmit port and a first memory coupled with the first transmit port, the first memory is configured to store the packets that is in the first packet flow and received by the forwarding apparatus, and the first transmit port is configured to send the packets that is in the first packet flow and stored in the first memory.

For example, the first packet may be an IP packet. The first packet flow may be a plurality of IP packets having a same quintuple. The quintuple includes a source IP address, a destination IP address, a source port, a destination port, and a protocol. The source IP address, the destination IP address, and the protocol are fields in a layer-3 header (for example, an IP header). The source port and the destination port are fields in a layer-4 header (for example, a transmission control protocol (TCP) header or a user data protocol (UDP) header). The first packet may also be a MPLS packet or an Ethernet frame.

S502. The Forwarding Apparatus Determines at Least Two Types of Information in Four Types of Information Related to the First Packet.

The four types of information are a first type of information, a second type of information, a third type of information, and a fourth type of information respectively.

For example, the at least two types of information related to the first packet may include only the first type of information and the second type of information. Alternatively, the at least two types of information related to the first packet may include only the first type of information and the third type of information. Alternatively, the at least two types of information related to the first packet may include only the first type of information and the fourth type of information. Alternatively, the at least two types of information related to the first packet may include only the second type of information and the third type of information. Alternatively, the at least two types of information related to the first packet may include only the first type of information, the second type of information, and the third type of information. Alternatively, the at least two types of information related to the first packet may include only the first type of information, the second type of information, the third type of information, and the fourth type of information.

For example, when the at least two types of information related to the first packet include only the first type of information and the second type of information, the forwarding apparatus may determine only the first type of information and the second type of information, and the forwarding apparatus may not perform an action of determining the third type of information. The forwarding apparatus may not perform an action of determining the fourth type of information either. Certainly, when the at least two types of information related to the first packet include only the first type of information and the second type of information, the forwarding apparatus needs to determine the first type of information and the second type of information. In addition, the forwarding apparatus may determine other information. For example, the forwarding apparatus may determine the third type of information. An engineer may use a command line to configure a type of information that needs to be determined by the forwarding apparatus such that the forwarding apparatus has a function of determining at least two types of information.

The first type of information indicates a duration of staying in the first memory by the first packet flow when the first packet is received.

For example, the first memory stores a first in first out queue. When receiving the packet in the first packet flow, the forwarding apparatus needs to enqueue the packet to the first in first out queue. When the packet is enqueued to the first in first out queue, the packet is located in a tail of the first in first out queue. When the packet is located in a head of the first in first out queue, the forwarding apparatus may dequeue the packet. After the packet is dequeued, the forwarding apparatus may send the first packet through the first transmit port. A duration from enqueuing the packet to the first in first out queue to dequeuing the packet from the first in first out queue is a duration of staying in the first memory by the packet. The duration of staying in the first memory by the first packet flow may be an average value of durations of staying in the first memory by the plurality of packets in the first packet flow.

For example, the forwarding apparatus may be a traffic manager. When receiving a packet 1 in the first packet flow, the traffic manager may first enqueue the packet 1 to the first in first out queue, and store an enqueuing time t1 of the packet 1. The traffic manager may store a dequeuing time t2 of the packet 1 when dequeuing the packet from the first in first out queue. The traffic manager may determine a duration of staying in the first memory by the packet 1 according to a difference between t2 and t1. The traffic manager may use the difference between the t2 and the t1 as the duration of staying in the first memory by the first packet flow when the packet 1 is received. In addition, the traffic manager may receive a plurality of packets in the first packet flow, perform enqueue management and dequeue management on the plurality of packets, and obtain an enqueuing time and a dequeuing time of each packet. The traffic manager may obtain a duration of staying in the first memory by each packet in the plurality of packets by referring to the procedure for processing the packet 1. The traffic manager may use the average value of the plurality of durations as the duration of staying in the first memory by the first packet flow when the first packet is received.

The second type of information indicates usage of the first memory when the first packet is received.

For example, the first memory may be only used to store the packet in the first packet flow. Alternatively, the first memory may be not only used to store the packet of the first packet flow, but also used to store packets of other packet flows. Before the first packet flow is forwarded by the forwarding apparatus through the first transmit port, the first memory needs to store the first packet flow. It may be understood that, when the usage of the first memory is relatively low, a congestion degree of the first packet flow may be considered as relatively low. In this case, a drop algorithm of a relatively low drop degree may be used to perform drop management on the first packet flow. For example, when the usage of the first memory is 5%, available storage space of the first memory is relatively large. A WRED algorithm of a relatively low drop degree may be used to perform drop management on the first packet flow. Thereby, most packets of the first packet flow that are received by the forwarding apparatus may be stored in the first memory. When the usage of the first memory is relatively high, it may be considered that a congestion degree of the first packet flow is relatively high. In this case, a drop algorithm of a relatively high drop degree may be used to perform drop management on the first packet flow. For example, when the usage of the first memory is 95%, the available storage space of the first memory is relatively small. A WRED algorithm of a relatively high drop degree may be used to perform drop management on the first packet flow. Thereby, only a few packets of the first packet flow that are received by the forwarding apparatus may be stored in the first memory.

For example, the forwarding apparatus may be a traffic manager. The traffic manager may store a size of storage space of the first memory. The size of the storage space of the first memory is equal to a sum of a size of the available storage space of the first memory and a size of used storage space of the first memory. When the first memory does not store any packet, the size of the available storage space of the first memory is equal to the size of the storage space of the first memory. When the first memory stores a packet, the size of the available storage space of the first memory is less than the size of the storage space of the first memory.

The first memory may send the size of the used storage space of the first memory to the traffic manager. The traffic manager may use a quotient obtained by dividing the size of the used storage space of the first memory by the size of the storage space of the first memory, as the usage of the first memory when the first packet is received.

Alternatively, the first memory may send the size of the available storage space of the first memory to the traffic manager. The traffic manager may use a difference between the size of the storage space of the first memory and the size of the available storage space of the first memory, as the size of the used storage space of the first memory. Further, the traffic manager may use a quotient obtained by dividing the size of the used storage space of the first memory by the size of the storage space of the first memory, as the usage of the first memory when the first packet is received.

The third type of information indicates whether the first packet flow is a victim of a congestion control mechanism when the first packet is received.

A class of service of the first packet flow is a first class of service.

When the forwarding apparatus receives a backpressure signal corresponding to the first class of service through the transmit port of the forwarding apparatus, the first packet flow is a victim of the congestion control mechanism.

When the forwarding apparatus does not receive a backpressure signal corresponding to the first class of service through the transmit port of the forwarding apparatus, the first packet flow is not a victim of the congestion control mechanism.

For example, the first packet flow may be an Ethernet frame flow. A frame header of an Ethernet frame may include a class of service. The class of service is a field of three bits. The value of the field is a value from 0 to 7. The foregoing eight values are also referred to as CS0 to CS7. The first class of service may be one of CS0 to CS7. For example, the first class of service may be CS0.

For example, the forwarding apparatus may be a traffic manager. The transmit port of the forwarding apparatus may be a transceiver of the traffic manager. The forwarding apparatus may include at least one transmit port. The at least one transmit port is configured to send the first packet flow. Further, the traffic manager may send, through the at least one transmit port, the first packet flow stored in the first memory.

For example, the congestion control mechanism may be a backpressure mechanism. For example, the following describes the backpressure mechanism using an example in which the forwarding apparatus is a traffic manager, the transmit port of the forwarding apparatus is a transceiver of the traffic manager, and the receive port of the forwarding apparatus is the transceiver of the traffic manager. The transceiver of the traffic manager receives the backpressure signal. The backpressure signal may be triggered by downstream congestion of the traffic manager. For example, the transmit port of the network apparatus of the traffic manager is congested. Alternatively, a next-hop network apparatus of the network apparatus of the traffic manager is congested. The backpressure signal may comply with priority-based flow control (PFC) defined by Institute of Electrical and Electronics Engineers (IEEE) standard 802.1Qbb. Alternatively, the backpressure signal may comply with a pause frame (pause frame) defined in 802.13X published by the IEEE. The backpressure signal may be used to indicate that a packet flow of the first class of service is congested. For example, a packet flow of the class of service CS0 is congested. It should be noted that, the traffic manager may be configured to forward a packet flow whose class of service is the first class of service. The traffic manager may also be configured to forward a plurality of packet flows whose class of service is the first class of service. In addition, the traffic manager may be further configured to forward a packet flow of another class of service. For example, the traffic manager is further configured to forward a packet flow whose class of service is CS2. After the traffic manager receives the backpressure signal, the traffic manager may reduce a rate of sending packets of the first class of service to the downstream, to mitigate the downstream congestion. The traffic manager may maintain a backpressure waterline. The traffic manager determines, according to the backpressure waterline, whether to send a backpressure signal to the upstream of the traffic manager. For example, the upstream of the traffic manager may be a receive port of the network apparatus of the traffic manager. Alternatively, the upstream of the traffic manager may be a previous-hop network apparatus of the network apparatus of the traffic manager. When the traffic manager determines that a length of a packet queue stored in the memory is equal to or greater than the backpressure waterline, the traffic manager determines that a backpressure signal needs to be sent to the upstream. When the traffic manager needs to send a backpressure signal to the upstream, the traffic manager may send the backpressure signal to the upstream through the transceiver of the traffic manager. When the traffic manager receives a backpressure signal from the downstream, the traffic manager needs to reduce a rate of sending the packet flow of the first class of service to the downstream, to mitigate the downstream congestion. When the traffic manager performs enqueue management on the received packet according to the WRED algorithm, the traffic manager needs to determine, according to the length of the packet queue and a relationship between a minimum queue threshold and a maximum queue threshold corresponding to the WRED algorithm, whether the received packet needs to be dropped, or whether ECN marking needs to be performed on the received packet. When determining that the received packet needs to be dropped, the traffic manager avoids enqueuing the received packet to the packet queue. Alternatively, when determining that ECN marking needs to be performed on the received packet, the traffic manager enqueues, to the packet queue, the packet on which ECN marking is performed. In a case in which the rate of sending the packet flow of the first class of service by the traffic manager to the downstream needs to be reduced, compared with a case in which the rate of sending the packet flow of the first class of service by the traffic manager to the downstream does not change, after a shorter duration, a length of the packet queue that is stored in the memory and includes the packet flow of the first class of service may reach the minimum queue threshold or the maximum queue threshold. Therefore, compared with the case in which the rate of sending the packet flow of the first class of service by the traffic manager to the downstream does not change, a drop probability of the packet of the first class of service received by the traffic manager increases, or a probability of ECN marking of the packet of the first class of service received by the traffic manager increases. Therefore, the packet flow of the first class of service is a victim of the congestion control mechanism.

It is assumed that a class of service of a packet flow 1 is CS1, and that a class of service of a packet flow 2 is CS2. The traffic manager is configured to forward the packet flow 1 and the packet flow 2. The traffic manager performs enqueue management and dequeue management on the packet flow 1. Further, the traffic manager uses a WRED1 algorithm to perform enqueue management on the packet flow 1. A minimum queue threshold corresponding to the WRED1 algorithm is MIN1, and a maximum queue threshold corresponding to the WRED1 algorithm is MAX1. The traffic manager may determine, according to the WRED1 algorithm, whether a packet in the packet flow 1 needs to be dropped. When determining that the packet in the packet flow 1 needs to be dropped, the traffic manager drops the packet. When determining that the packet in the packet flow 1 does not need to be dropped, the traffic manager enqueues the packet to a first in first out queue. Optionally, the traffic manager may determine, according to the WRED1 algorithm, whether ECN marking needs to be performed on the packet in the packet flow 1. When determining that ECN marking needs to be performed, the traffic manager performs ECN marking on the packet. When determining that ECN marking does not need to be performed, the traffic manager avoids performing ECN marking on the packet. The traffic manager receives a backpressure signal 1 sent by the downstream, where the backpressure signal 1 is used to indicate that the packet flow whose class of service is CS1 is congested. After receiving the backpressure signal 1, the traffic manager reduces a rate of sending the packet flow 1 to the downstream. Consequently, a duration required for a length of the first in first out queue including the packet flow 1 to reach the MIN1 or the MAX1 becomes shorter. For example, if the traffic manager does not receive the backpressure signal 1, the duration required for the length of the first in first out queue including the packet flow 1 to reach the MIN1 is 2 seconds. If the traffic manager receives the backpressure signal 1, the duration required for the length of the first in first out queue including the packet flow 1 to reach the MIN1 is 1 second. In other words, compared with the case in which no backpressure signal is received, when the traffic manager receives the backpressure signal, a drop probability of the packet in the packet flow 1 is increased, or a probability of ECN marking of the packet in the packet flow 1 is increased. Therefore, the packet flow 1 is a victim of the congestion control mechanism. The packet flow 2 is not a victim of the congestion control mechanism.

For example, the forwarding apparatus may be a traffic manager. The backpressure signal may be a pause frame. The pause frame carries an identifier of a class of service of a congested packet flow. After receiving the pause frame, the traffic manager may parse the pause frame, and therefore determine the class of service of the congested packet flow. The class of service of the congested packet flow may be the first class of service or may be another class of service. In addition, the first packet received by the traffic manager may be sent by the network processor. The network processor may parse the first packet and therefore determine the class of service of the first packet. The network processor may send the class of service of the first packet, that is, the first class of service, to the traffic manager. The traffic manager may determine, according to the class of service of the first packet and the class of service of the congested packet flow, whether the first packet flow is a victim of the congestion control mechanism. When the class of service of the first packet is the same as that of the congested packet flow, the traffic manager may determine that the first packet flow is a victim of the congestion control mechanism. When the class of service of the first packet is different from that of the congested packet flow, the traffic manager may determine that the first packet flow is not a victim of the congestion control mechanism.

The fourth type of information indicates a drop priority of the first packet. The drop priority of the first packet is determined based on a field used to indicate a scheduling priority in the first packet. Alternatively, the drop priority of the first packet is determined based on protocol drop sensitivity of the first packet.

For example, the field used to indicate the scheduling priority in the first packet is an EXP field in an MPLS label, a PCP field in a VLAN tag, or a DSCP field in an IP header.

For example, the protocol drop sensitivity indicates a degree of reducing a rate of sending the protocol packet by a source of the protocol packet because the protocol packet is dropped or is ECN-marked in a transmission process.

For example, a source of a TCP packet is a TCP sender. According to TCP, after the TCP packet is dropped in a transmission process, the TCP sender may reduce a rate of sending the TCP packet. According to the UDP, after a UDP packet is dropped in a transmission process, a source of the UDP packet does not reduce a rate of sending the UDP packet. Therefore, TCP drop sensitivity is higher than UDP drop sensitivity. For example, if a protocol of the packet flow 1 is a TCP packet flow, and a protocol of the packet flow 2 is a UDP packet flow, drop sensitivity of the packet flow 1 is higher than drop sensitivity of the packet flow 2.

For example, the forwarding apparatus may be a traffic manager. The traffic manager stores a mapping table 1 between scheduling priorities and drop priorities. Specifically, the mapping table 1 includes a plurality of entries, and each entry includes a value of a scheduling priority and a value of a drop priority corresponding to the scheduling priority. After receiving the first packet, the traffic manager may parse the first packet to obtain the field used to indicate the scheduling priority in the first packet. The traffic manager may search, using the value of the field used to indicate the scheduling priority in the first packet as a search keyword, the mapping table 1 for an entry 1 matching the field used to indicate the scheduling priority in the first packet. A value of a scheduling priority included in the entry 1 is equal to the value of the field used to indicate the scheduling priority in the first packet. The traffic manager may use a drop priority corresponding to a value of a drop priority in the entry 1 as the drop priority of the first packet.

For example, the forwarding apparatus may be a traffic manager. The traffic manager stores a mapping table 2 between protocols and drop priorities. Specifically, the mapping table 2 includes a plurality of entries, and each entry stores a type of a protocol and a value of a drop priority corresponding to the protocol. After receiving the first packet, the traffic manager may parse the first packet to obtain a type of a protocol of the first packet. The traffic manager may search, using the type of the protocol of the first packet as a search keyword, the mapping table 2 for an entry 2 matching the type of the protocol of the first packet. A type of a protocol included in the entry 2 is the same as the type of the protocol of the first packet. The traffic manager may use a drop priority corresponding to a value of a drop priority in the entry 2 as the drop priority of the first packet.

S503. The Forwarding Apparatus Determines, Based on the at Least Two Types of Information Related to the First Packet, Whether ECN Marking Needs to be Performed on the First Packet.

For example, the forwarding apparatus may maintain a mapping table. Further, the traffic manager of the forwarding apparatus may maintain the mapping table. The mapping table may include a plurality of entries. An entry of the mapping table may store the at least two types of information related to the first packet, an identifier of the WRED algorithm, and the maximum queue threshold and the minimum queue threshold corresponding to the WRED algorithm. When the forwarding apparatus receives the first packet, the forwarding apparatus may search, using the at least two types of information related to the first packet as a search keyword, the mapping table for an entry matching the at least two types of information related to the first packet. The forwarding apparatus may determine, according to a maximum queue threshold and a minimum threshold in the matched entry, whether ECN marking needs to be performed on the first packet. For example, when the forwarding apparatus detects that the forwarding apparatus receives the first packet, the length of the first in first out queue in the first memory is L. When L is less than the minimum queue threshold in the matched entry, the forwarding apparatus determines that ECN marking does not need to be performed on the first packet. When L is greater than the maximum queue threshold in the matched entry, the forwarding apparatus determines that ECN marking needs to be performed on the first packet. When L is greater than the minimum queue threshold in the matched entry and less than the maximum queue threshold in the matched entry, the forwarding apparatus determines that ECN marking may be performed on the first packet. The forwarding apparatus may further determine, according to other factors, whether ECN marking needs to be performed on the first packet. Before performing S503, the forwarding apparatus may determine whether the first packet is ECN-capable. If determining that the first packet is already ECN-capable, the forwarding apparatus may perform S503. For example, when the first packet includes an ECN-capable transport codepoint (ECT codepoint) '10', the forwarding apparatus may determine that the first packet is already ECN-capable. When the first packet includes an ECT codepoint '01', the forwarding apparatus may determine that the first packet is already ECN-capable. When a value of an ECN field included in the first packet is equal to '00', the forwarding apparatus may determine that the first packet is not ECN-capable.

Optionally, the forwarding apparatus may not perform an action of determining whether ECN marking needs to be performed on the first packet, but determines, based on the at least two types of information related to the first packet, whether the first packet needs to be dropped. Further, the forwarding apparatus may determine, according to the maximum queue threshold and the minimum queue threshold in the matched entry, whether the first packet needs to be dropped. For example, when the forwarding apparatus detects that the forwarding apparatus receives the first packet, the length of the first in first out queue in the first memory is L. When L is less than the minimum queue threshold in the matched entry, the forwarding apparatus determines that the first packet does not need to be dropped. When L is greater than the maximum queue threshold in the matched entry, the forwarding apparatus determines that the first packet needs to be dropped. When L is greater than the minimum queue threshold in the matched entry and less than the maximum queue threshold in the matched entry, the forwarding apparatus determines that the first packet may be dropped. The forwarding apparatus may further determine, according to other factors, whether the first packet needs to be dropped. Before the forwarding apparatus determines whether the first packet needs to be dropped, the forwarding apparatus may determine whether the first packet is already ECN-capable. If determining that the first packet is not ECN-capable, the forwarding apparatus may perform an action of determining whether the first packet needs to be dropped. For example, when the value of the ECN field included in the first packet is equal to '00', the forwarding apparatus may determine that the first packet is not ECN-capable. Further, the forwarding apparatus may perform the action of determining whether the first packet needs to be dropped.

Optionally, the forwarding apparatus may not perform the action of determining whether ECN marking needs to be performed on the first packet, but determines, based on the at least two types of information related to the first packet, whether the first packet needs to be dropped. For a specific implementation, refer to the foregoing processing step of determining whether the first packet needs to be dropped after determining that the first packet is not ECN-capable. Details are not further described herein.

Table 1 is a possible schematic diagram of the mapping table. Referring to Table 1, the mapping table may include an identifier of an entry, the first type of information, the second type of information, the third type of information, the fourth type of information, the identifier of the WRED algorithm, the maximum queue threshold, and the minimum queue threshold. The mapping table shown in Table 1 includes four entries. The first type of information, the second type of information, the third type of information, and the fourth type of information belong to a match field.

A search keyword is compared with the match field such that an entry matching the search keyword is found from the mapping table. In a specific implementation, the mapping table may use a structure different from Table 1. For example, the mapping table may include a plurality of associated sub tables. For example, the mapping table may include Table 2 and Table 3. The mapping table may include more or fewer entries. In addition, the mapping table may include more or fewer columns. For example, the match field may include only two types of information (for example, the first type of information and the fourth type of information). The match field may include only three types of information (for example, the second type of information, the third type of information, and the fourth type of information). The forwarding apparatus needs to determine a quantity of types of information related to the first packet, and the quantity of types of information included in the match field is related to the determined quantity. For example, in S502, when the forwarding apparatus determines that the quantity of types of information related to the first packet is 2, the match field may include only two types of information (for example, the second type of information and the third type of information). For another example, in S502, when the forwarding apparatus determines that the quantity of types of information related to the first packet is 3, the match field may include only three types of information (for example, the first type of information, the second type of information, and the third type of information). In the mapping table shown in Table 1, the first type of information is indicated by a range. For example, a value of the first type of information in an entry 1 is 3 to 5 seconds. In a specific implementation, alternatively, a value of the first type of information may not be a range. For example, the value of the first type of information is 1 second. In the mapping table shown in Table 1, the second type of information is indicated by a range. For example, a value of the second type of information in an entry 2 is 70% to 80%. In a specific implementation, alternatively, a value of the second type of information may not be a range. For example, the value of the second type of information is 75%. In addition, in different entries, values of the first type of information may be equal or may overlap partially. For example, the value of the first type of information in an entry 4 and the value of the first type of information in an entry 3 overlap partially. In different entries, values of the second type of information may be equal or may overlap partially. For example, the value of the second type of information in the entry 3 and the value of the second type of information in the entry 4 overlap partially.

TABLE 1

| Identifier of an entry | First type of information | Second type of information | Third type of information | Fourth type of information | Identifier of a WRED algorithm | Maximum queue threshold | Minimum queue threshold |
|---|---|---|---|---|---|---|---|
| Entry 1 | 1 second | 60% to 70% | Victim | Drop priority 1 | WRED1 | MAX1 | MIN1 |
| Entry 2 | 2 seconds | 70% to 80% | Not a victim | Drop priority 2 | WRED2 | MAX2 | MIN2 |
| Entry 3 | 3 to 5 seconds | 20% to 25% | Victim | Drop priority 3 | WRED3 | MAX3 | MIN3 |
| Entry 4 | 4 to 10 seconds | 20% to 30% | Not a victim | Drop priority 4 | WRED4 | MAX4 | MIN4 |

S504. When Determining that ECN Marking Needs to be Performed on the First Packet, the Forwarding Apparatus Performs ECN Marking on the First Packet.

In a specific implementation, when the forwarding apparatus determines that ECN marking needs to be performed on the first packet, the forwarding apparatus may change the value of the ECN field included in the first packet from '10' to '11'. Alternatively, the forwarding apparatus may change the value of the ECN field included in the first packet from '01' to '11'.

After the forwarding apparatus performs ECN marking on the first packet, the forwarding apparatus may store, in the first memory, the first packet on which ECN marking is performed. Specifically, the first packet on which ECN marking is performed may be enqueued to the first in first out queue stored in the first memory.

Alternatively, the forwarding apparatus may not perform ECN marking on the first packet, but stores the first packet in the first memory when determining that the first packet does not need to be dropped. Further, if the forwarding apparatus determines that the first packet needs to be dropped, the forwarding apparatus may drop the first packet. If the forwarding apparatus determines that the first packet does not need to be dropped, the forwarding apparatus may store the first packet in the first memory. When the forwarding apparatus stores the first packet in the first memory, the forwarding apparatus may enqueue the first packet to the first in first out queue stored in the first memory.

Figure 6:
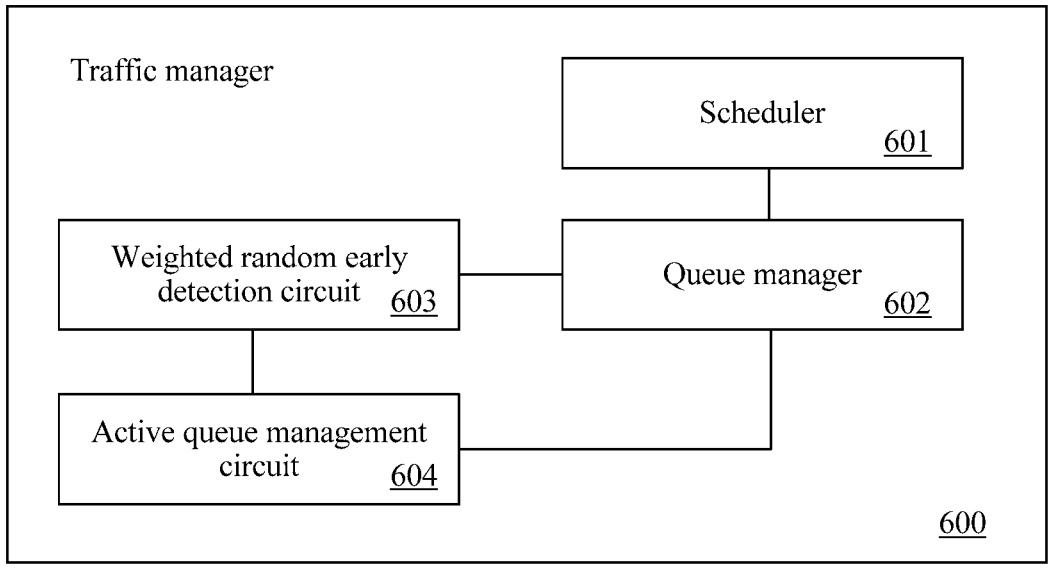
FIG. 6 is a schematic structural diagram of a traffic manager according to this application.

With reference to FIG. 4 and FIG. 6, the following describes the method shown in FIG. 5 using an example. FIG. 6 is a schematic structural diagram of a traffic manager according to this application. For example, a traffic manager 600 shown in FIG. 6 may be configured to implement the traffic manager 402 in FIG. 4 or the traffic manager 301 in FIG. 3.

Referring to FIG. 6, the traffic manager 600 includes a scheduler 601, a queue manager 602, a WRED circuit 603, and an active queue management (AQM) circuit 604. The AQM circuit 604 is coupled with the WRED circuit 603. The WRED circuit 603 is coupled with the queue manager 602. The queue manager 602 is coupled with the scheduler 601. The queue manager 602 is coupled with the AQM circuit 604. In addition, the AQM circuit 604 is coupled with the network processor 1242 in FIG. 4. The AQM circuit 604 is coupled with the memory 403.

The network processor 1242 can receive an IP packet. The network processor 1242 can send the IP packet to the AQM circuit 604.

The AQM circuit 604 can determine information related to the IP packet.

The following uses an example to describe a specific implementation of determining information related to the IP packet by the AQM circuit 604.

For example, the network processor 1242 can parse the IP packet to obtain a field used to indicate a scheduling priority in the IP packet. For example, the network processor 1242 can obtain a DSCP field from an IP header of the IP packet. The network processor 1242 can send the DSCP field to the AQM circuit 604. The AQM circuit 604 may maintain a mapping table between DSCP fields and drop priorities. The AQM circuit 604 may determine a drop priority of the IP packet according to the mapping table between DSCP fields and drop priorities that is stored in the AQM circuit 604.

For example, the forwarding apparatus may forward a plurality of packet flows. The network processor 1242 can store an identifier of a receive port used to receive each packet flow in the plurality of packet flows, and an identifier of a transmit port used to send each packet flow in the plurality of packet flows, and feature information (for example, a quintuple) of each packet flow in the plurality of packet flows. In addition, the network processor 1242 can detect whether a receive port that triggers transmission of a backpressure signal to the receive port of the forwarding apparatus due to congestion exists in the forwarding apparatus. After the network processor 1242 receives the IP packet, the network processor 1242 may parse the IP packet to obtain feature information of the IP packet. The network processor 1242 may determine, according to the feature information of the IP packet, a receive port, a transmit port, and a class of service of a packet flow to which the IP packet belongs. The network processor 1242 can send the foregoing information of the IP packet to the traffic manager. After receiving the backpressure signal, the traffic manager may parse the backpressure signal to determine a class of service of a congested packet flow. The traffic manager may compare the class of service of the IP packet and the class of service of the congested packet flow to determine whether the packet flow to which the IP packet belongs is a victim of the congestion control mechanism. When the class of service of the IP packet is the same as that of the congested packet flow, the traffic manager determines that the packet flow to which the IP packet belongs is a victim of the congestion control mechanism. When the class of service of the IP packet is different from that of the congested packet flow, the traffic manager determines that the packet flow to which the IP packet belongs is not a victim of the congestion control mechanism.

For example, the AQM circuit 604 may prestore a size of memory space of the memory 403. In addition, the AQM circuit 604 may detect the size of the storage space occupied in the memory 403 at a time. Further, the AQM circuit 604 may determine usage of the memory 403 at a time.

For example, the memory 403 may maintain one or more packet queues. Each packet queue corresponds to a packet flow. The queue manager 602 may count a quantity of bytes of a packet dequeued from the packet queue stored in the memory 403 in a duration. Further, the queue manager 602 may determine a transmission rate of the packet flow in a duration according to the quantity of the bytes of the dequeued packet and the duration. The queue manager 602 may send the transmission rate of the packet flow to the AQM circuit 604. Further, the AQM circuit 604 may determine the transmission rate of the packet flow.

After the AQM circuit 604 determines the information related to the IP packet, the AQM circuit 604 can determine an identifier of a WRED algorithm according to the information related to the IP packet.

In a specific implementation, the AQM circuit 604 may store a mapping table between information related to IP packets and identifiers of WRED algorithms. In the following description, it is assumed that the information related to the IP packet includes only usage of the memory and a duration of staying in the memory by the packet flow. Table 2 is a possible implementation of the mapping table. Referring to Table 2, the mapping table includes an identifier of an entry, the usage of the memory, the duration of staying in the memory by the packet flow, and the identifier of the WRED algorithm. After receiving the IP packet, the AQM circuit 604 may determine that the usage of the memory 403 is 25% when the IP packet is received. In addition, the AQM circuit 604 may determine that the duration of staying in the memory by the packet flow to which the IP packet belongs is 2.5 seconds when the IP packet is received. The AQM circuit 604 uses 25% (the usage of the memory) and 2.5 seconds (the duration of staying in the memory by the packet flow) as search keywords to search the table for a matched entry. The AQM circuit 604 determines that an entry 1 is the matched entry. The AQM circuit 604 determines, according to the entry 1, that the identifier of the WRED algorithm is WRED1.

TABLE 2

| Identifier of an entry | Usage of the memory | Duration of staying in the memory by the packet flow | Identifier of a WRED algorithm |
|---|---|---|---|
| Entry 1 | 20% to 30% | 2 to 3 seconds | WRED1 |
| Entry 2 | 40% to 50% | 5 to 10 seconds | WRED2 |

The WRED circuit 603 can receive the IP packet from the AQM circuit 604, and the identifier of the WRED algorithm corresponding to the IP packet. The WRED circuit 603 can execute the WRED algorithm. Further, the WRED circuit 603 may store a maximum queue threshold and a minimum queue threshold of the first WRED algorithm. The WRED circuit 603 can obtain a length of the packet queue from the queue manager 602. The WRED circuit 603 can determine, according to the identifier of the WRED algorithm, whether ECN marking needs to be performed on the IP packet, or whether the IP packet needs to be dropped. Alternatively, when the WRED circuit 603 determines, according to the identifier of the WRED algorithm, that ECN marking does not need to be performed on the IP packet, the WRED circuit 603 can determine, according to the identifier of the WRED algorithm, whether to drop the IP packet.

For example, the WRED circuit 603 may store Table 3. Referring to Table 3, each entry in Table 3 includes an identifier of a WRED algorithm, a maximum queue threshold, and a minimum queue threshold. When the WRED circuit 603 receives the WRED1 sent by the AQM circuit 604, the WRED circuit 603 uses the WRED1 as a search keyword to search Table 3 for an entry matching the WRED1. The WRED circuit 603 determines a parameter of the WRED1 according to the entry matching the WRED1. The parameter of the WRED1 includes a maximum queue threshold and a minimum queue threshold. The maximum queue threshold is equal to MAX1. The minimum queue threshold is equal to MIN1. Further, the WRED circuit 603 obtains the length of the packet queue from the queue manager 602. The WRED circuit 603 determines, according to the obtained information, whether ECN marking needs to be performed on the IP packet, or whether the IP packet needs to be dropped.

TABLE 3

| Identifier of a WRED algorithm | Maximum queue threshold | Minimum queue threshold |
|---|---|---|
| WRED1 | MAX1 | MIN1 |
| WRED2 | MAX2 | MIN2 |

In addition, when the WRED circuit 603 determines that ECN marking needs to be performed on the IP packet, the WRED circuit 603 can perform ECN marking on the IP packet. In addition, the WRED circuit 603 can enqueue the IP packet on which ECN marking is performed to a first in first out queue stored in the memory 403. When the WRED circuit 603 determines that the IP packet needs to be dropped, the WRED circuit 603 can drop the IP packet, to prevent the IP packet from being enqueued to the first in first out queue stored in the memory 403.

The queue manager 602 is configured to store and maintain a packet descriptor queue. Further, when the WRED circuit 603 determines to enqueue the received packet, the queue manager 602 adds, to a tail of the packet descriptor queue, a packet descriptor corresponding to the packet enqueued to the packet queue. The queue manager 602 may notify the scheduler 601 that a new packet descriptor is added to the tail of the packet descriptor queue.

The scheduler 601 may determine, according to information notified by the queue manager 602, a policy for scheduling the packet in the packet queue. After the queue manager 602 receives a scheduling command sent by the scheduler 601, the queue manager 602 may send a read request to the memory 302 according to a packet descriptor located in a head of the packet descriptor queue, to obtain the packet corresponding to the packet descriptor located in the head of the packet descriptor queue, that is, the packet located in the head of the packet queue. The queue manager 602 may send the packet to the iFIC 303. Because the queue manager 602 has scheduled the packet located in the head of the packet queue out of the packet queue, the queue manager 602 deletes the packet descriptor located in the head of the packet descriptor queue. In addition, the queue manager 602 determines, according to the maintained packet descriptor queue, a quantity of packet descriptors included in the packet descriptor queue, determines a length of the first in first out queue according to the quantity of the packet descriptors, and notifies the length of the first in first out queue to the WRED circuit 603.

Optionally, in the method shown in FIG. 5, the method may further include the following steps.

The forwarding apparatus receives a second packet.

For example, the forwarding apparatus may be a network apparatus. The network apparatus may include a plurality of receive ports. Each receive port may be an Ethernet port. The traffic manager located in the network apparatus may be connected to a plurality of receive ports and a plurality of transmit ports of the network apparatus. For example, each transmit port may be a GE port. Each receive port may be a GE port. Referring to FIG. 2, the network apparatus may be the router 2 shown in FIG. 2. The physical interface card 1243 may include a plurality of Ethernet ports. The plurality of receive ports of the network apparatus may be a plurality of Ethernet ports included in the physical interface card 1243.

The traffic manager includes a transceiver. The traffic manager may receive a packet from a receive port of the network apparatus through the transceiver. After receiving the packet, the traffic manager may store the packet in a memory. The traffic manager may send the packet stored in the memory to a transmit port of the network apparatus through the transceiver. The transceiver that receives the second packet in the traffic manager and the transceiver that receives the first packet in the traffic manager may be different transceivers. Referring to FIG. 4, the forwarding apparatus may be the traffic manager 402 shown in FIG. 4. The traffic manager 402 may include a plurality of transceivers (not shown in the figure). The traffic manager 402 may receive a packet from the network processor 1242 through a transceiver coupled with the network processor 1242. After receiving the packet from the network processor 1242, the traffic manager 402 may store the packet in the memory 403. In addition, the traffic manager 402 may send the packet stored in the memory 403 to the physical interface card 1243 through a transceiver coupled with the physical interface card 1243. The memory 403 may be a first in first out memory.

The second packet belongs to a second packet flow, the forwarding apparatus includes a second transmit port and a second memory coupled with the second transmit port, the second memory is configured to store the packets that is in the second packet flow and received by the forwarding apparatus, and the second transmit port is configured to send the packets that is in the second packet flow and stored in the second memory.

For example, the forwarding apparatus may include a plurality of transmit ports and a plurality of memories. Each transit port is coupled with a memory. The plurality of memories are configured to store a plurality of packet flows. Each packet flow stored in the memory is a packet queue. Specifically, the packet queue is a first in first out queue. When sending a packet, each transmit port needs to access a packet queue stored in the coupled memory. For example, the first memory and the second memory may be the same memory or may be different memories. The first transmit port and the second transmit port may be the same transmit port or may be different transmit ports.

For specific implementations of the second packet and the second packet flow, refer to the descriptions about the first packet and the first packet flow in the foregoing embodiment. It should be noted that, the second packet is different from the first packet. The second packet flow is different from the first packet flow.

The forwarding apparatus determines at least two types of information related to the second packet.

Specifically, the at least two types of information related to the second packet are information in the following four types of information. The four types of information are a fifth type of information, a sixth type of information, a seventh type of information, and an eighth type of information.

The fifth type of information indicates a duration of staying in the second memory by the second packet flow when the second packet is received.

The sixth type of information indicates usage of the second memory when the second packet is received.

The seventh type of information indicates whether the second packet flow is a victim of the congestion control mechanism when the second packet is received.

A class of service of the second packet flow is a second class of service.

When the forwarding apparatus receives a backpressure signal corresponding to the second class of service through the transmit port of the forwarding apparatus, the second packet flow is a victim of the congestion control mechanism.

When the forwarding apparatus does not receive a backpressure signal corresponding to the second class of service through the transmit port of the forwarding apparatus, the second packet flow is not a victim of the congestion control mechanism.

For example, the forwarding apparatus may be a traffic manager, and the transmit port of the forwarding apparatus may be a transceiver of the traffic manager. The forwarding apparatus may include at least one transmit port. The at least one transmit port is configured to send the second packet flow. For example, the traffic manager may send, through the at least one transmit port, the second packet flow stored in the second memory. The transmit port configured to send the first packet flow and the transmit port configured to send the second packet flow in the traffic manager may be the same transmit port or may be different transmit ports.

The second class of service is different from the first class of service.

When the traffic manager receives the backpressure signal corresponding to the second class of service, the traffic manager may determine that the packet flow corresponding to the second class is congested. Further, the traffic manager may reduce a transmission rate of the packet flow corresponding to the second class of service. Therefore, the traffic manager may reduce a rate of sending the second packet flow to the downstream through the transmit port. If the traffic manager uses the WRED algorithm to perform drop management or ECN marking management on the second packet, a length of the packet queue including the second packet flow reaches the minimum queue threshold or the maximum queue threshold of the WRED algorithm in a shorter duration. Therefore, a drop probability of the second packet is increased, or a probability of ECN marking of the second packet is increased. Therefore, when the traffic manager receives the backpressure signal corresponding to the second class of service, the second packet flow is a victim of the congestion control mechanism, and the first packet flow is not a victim of the congestion control mechanism.

For a meaning and a specific implementation of the victim of the congestion control mechanism, refer to the foregoing descriptions about the third type of information. Details are not further described herein.

The eighth type of information indicates a drop priority of the second packet.

The drop priority of the second packet is determined based on a field used to indicate a scheduling priority in the second packet, or is determined based on protocol drop sensitivity of the second packet.

For the fifth type of information, the sixth type of information, the seventh type of information, and the eighth type of information, refer to the descriptions about the first type of information, the second type of information, the third type of information, and the fourth type of information respectively in the foregoing embodiment. It should be noted that, the first type of information, the second type of information, the third type of information, and the fourth type of information are information related to the first packet. The fifth type of information, the sixth type of information, the seventh type of information, and the eighth type of information are information related to the second packet. Different names are used in this application so that a reader can distinguish.

It should be noted that, the forwarding apparatus may determine only two types of information related to the second packet. For example, the forwarding apparatus may determine only the sixth type of information and the eighth type of information. Certainly, the forwarding apparatus may also determine more types of information related to the second packet. In addition, for specific implementations of determining the fifth type of information, the sixth type of information, the seventh type of information, and the eighth type of information by the forwarding apparatus, refer to the descriptions about the specific implementations of determining the first type of information, the second type of information, the third type of information, and the fourth type of information by the forwarding apparatus in the foregoing embodiment. Details are not further described herein.

After determining the information related to the second packet, the forwarding apparatus may compare the at least two types of information related to the second packet with the at least two types of information related to the first packet, to determine whether the drop probability of the first packet or the drop probability of the second packet is higher. Alternatively, after determining the information related to the second packet, the forwarding apparatus may compare the at least two types of information related to the second packet with the at least two types of information related to the first packet, to determine whether the probability of ECN marking of the first packet or the probability of ECN marking of the second packet is higher. Further, the comparison performed by the forwarding apparatus may be implemented in a plurality of manners, and obtaining a result through comparison may also be implemented in a plurality of manners. The following uses an example for description.

For example, when the duration of staying in the first memory by the first packet flow is longer than the duration of staying in the second memory by the second packet flow, and at least one of the following three conditions is satisfied, the forwarding apparatus determines that the probability of ECN marking of the first packet is higher than the probability of ECN marking of the second packet, or the forwarding apparatus determines that the drop probability of the first packet is higher than the drop probability of the second packet the usage of the first memory is equal to the usage of the second memory, the first packet flow and the second packet flow are victims of the congestion control mechanism, and the drop priority of the first packet is equal to the drop priority of the second packet.

In the foregoing technical solution, the duration of staying in the first memory by the first packet flow is longer than the duration of staying in the second memory by the second packet flow. Therefore, it may be considered that the congestion degree of the first packet flow is higher than the congestion degree of the second packet flow. To reduce the congestion degree of the packet flow, the drop probability of the first packet and the drop probability of the second packet may be set. Specifically, the drop probabilities may be so set that the drop probability of the first packet is higher than the drop probability of the second packet. Alternatively, to reduce the congestion degree of the packet flow, the probability of ECN marking of the first packet and the probability of ECN marking of the second packet may be set. Specifically, the probabilities of ECN marking may be so set that the probability of ECN marking of the first packet is higher than the probability of ECN marking of the second packet. In the foregoing technical solution, different settings are performed for different packet flows. This helps reduce the congestion degree of the packet flow.

For example, when the usage of the first memory is higher than the usage of the second memory, and at least one of the following three conditions is satisfied, the forwarding apparatus determines that the probability of ECN marking of the first packet is higher than the probability of ECN marking of the second packet, or the forwarding apparatus determines that the drop probability of the first packet is higher than the drop probability of the second packet the duration of staying in the first memory by the first packet flow is equal to the duration of staying in the second memory by the second packet flow, the first packet flow and the second packet flow are victims of the congestion control mechanism, and the drop priority of the first packet is equal to the drop priority of the second packet.

In the foregoing technical solution, the usage of the first memory is higher than the usage of the second memory. Therefore, it may be considered that the congestion degree of the first packet flow is higher than the congestion degree of the second packet flow. To reduce the congestion degree of the packet flow, the drop probability of the first packet and the drop probability of the second packet may be set. Specifically, the drop probabilities may be so set that the drop probability of the first packet is higher than the drop probability of the second packet. Alternatively, to reduce the congestion degree of the packet flow, the probability of ECN marking of the first packet and the probability of ECN marking of the second packet may be set. Specifically, the probabilities of ECN marking may be so set that the probability of ECN marking of the first packet is higher than the probability of ECN marking of the second packet. In the foregoing technical solution, different settings are performed for different packet flows. This helps reduce the congestion degree of the packet flow.

For example, when the first packet flow is a victim of the congestion control mechanism and the second packet flow is not a victim of the congestion control mechanism, and at least one of the following three conditions is satisfied, the forwarding apparatus determines that the probability of ECN marking of the first packet is lower than the probability of ECN marking of the second packet, or the forwarding apparatus determines that the drop probability of the first packet is lower than the drop probability of the second packet the duration of staying in the first memory by the first packet flow is equal to the duration of staying in the second memory by the second packet flow, the usage of the first memory is equal to the usage of the second memory, and the drop priority of the first packet is equal to the drop priority of the second packet.

In the foregoing technical solution, the first packet flow is a victim of the congestion control mechanism and the second packet flow is not a victim of the congestion control mechanism. Therefore, it may be considered that the congestion degree of the first packet flow is higher than the congestion degree of the second packet flow. Further, the drop probability of the packet of the first packet flow according to the WRED algorithm is higher than the drop probability of the packet of the second packet flow according to the WRED algorithm. Alternatively, the drop probability of the packet of the first packet flow according to the WRED algorithm is higher than the drop probability of the packet of the second packet flow according to the WRED algorithm. In order that the first packet flow and the second packet flow can be enqueued to the first in first out queue in a balanced manner, the drop probability of the first packet and the drop probability of the second packet may be set. Specifically, the drop probabilities may be so set that the drop probability of the first packet is lower than the drop probability of the second packet. Alternatively, in order that ECN marking can be performed on the first packet flow and the second packet flow in a balanced manner, the probability of ECN marking of the first packet and the probability of ECN marking of the second packet may be set. Specifically, the probabilities of ECN marking may be so set that the probability of ECN marking of the first packet is lower than the probability of ECN marking of the second packet. The foregoing technical solution can meet a service requirement of the first packet flow and a service requirement of the second packet flow, and implement more balanced service processing.

For example, the traffic manager performs drop management on the packet flow 1 and the packet flow 2 according to WRED1. The minimum queue threshold corresponding to the WRED1 is MIN1, and the corresponding maximum queue threshold is MAX1. When the traffic manager receives the packet 1 in the packet flow 1 and the packet 2 in the packet flow 2, the traffic manager receives the backpressure signal 1 of the corresponding class of service 1. The class of service of the packet flow 1 is the class of service 1. After receiving the backpressure signal 1, the traffic manager reduces the rate of sending the packet flow 1. Consequently, the length of the packet queue including the packet flow 1 reaches MIN1 corresponding to the WRED1 in a shorter duration. Therefore, the drop probability of the packet flow 1 is increased. Packets that can be enqueued to the packet flow 1 in the first in first out queue are reduced. To mitigate the case in which packets in the packet flow 1 that can be enqueued to the first in first out queue are reduced, the WRED algorithm for performing drop management on the packet flow 1 by the traffic manager may be adjusted from WRED1 to WRED2. The minimum queue threshold corresponding to the WRED2 is MIN2, and the corresponding maximum queue threshold is MAX2. MIN2 is greater than MIN1, and MAX2 is greater than MAX1. After the WRED algorithm is adjusted, the drop probability of the packet 1 is reduced. Further, the drop probability of the packet 1 can be lower than the drop probability of the packet 2. Further, both the packet flow 1 and the packet flow 2 can be enqueued to the first in first out queue in a balanced manner. Alternatively, in the foregoing solution, the traffic manager may perform ECN marking management on the packet flow 1 and the packet flow 2 according to WRED1. After receiving the backpressure signal 1, the traffic manager reduces the rate of sending the packet flow 1. Consequently, the length of the packet queue including the packet flow 1 reaches MIN1 corresponding to the WRED1 in a shorter duration. Therefore, the possibility of ECN marking of the packet flow 1 is increased. To mitigate the case in which ECN-marked packets in the packet flow 1 that are enqueued to the first in first out queue are increased, the WRED algorithm for performing ECN marking management on the packet flow 1 by the traffic manager may be adjusted from WRED1 to WRED2. The minimum queue threshold corresponding to the WRED2 is MIN2, and the corresponding maximum queue threshold is MAX2. MIN2 is greater than MIN1, and MAX2 is greater than MAX1. After the WRED algorithm is adjusted, the drop probability of the packet 1 is reduced. Further, the possibility of ECN marking of the packet 1 can be lower than the possibility of ECN marking of the packet 2. Further, ECN marking can be performed on the packet flow 1 and the packet flow 2 in a balanced manner.

For example, when the drop priority of the first packet is lower than the drop priority of the second packet, and at least one of the following three conditions is satisfied, the forwarding apparatus determines that the probability of ECN marking of the first packet is lower than the probability of ECN marking of the second packet, or the forwarding apparatus determines that the drop probability of the first packet is lower than the drop probability of the second packet a transmission rate of sending the first packet flow by the forwarding apparatus through the first transmit port is equal to a transmission rate of sending the second packet flow by the forwarding apparatus through the second transmit port, the usage of the first memory is equal to the usage of the second memory, and the first packet flow and the second packet flow are victims of the congestion control mechanism.

In the foregoing technical solution, the first packet flow is a victim of the congestion control mechanism and the second packet flow is not a victim of the congestion control mechanism. Therefore, it may be considered that the congestion degree of the first packet flow is higher than the congestion degree of the second packet flow. Further, the drop probability of the packet of the first packet flow according to the WRED algorithm is higher than the drop probability of the packet of the second packet flow according to the WRED algorithm. Alternatively, the drop probability of the packet of the first packet flow according to the WRED algorithm is higher than the drop probability of the packet of the second packet flow according to the WRED algorithm. In order that the first packet flow and the second packet flow can be enqueued to the first in first out queue in a balanced manner, the drop probability of the first packet and the drop probability of the second packet may be set. Specifically, the drop probabilities may be so set that the drop probability of the first packet is lower than the drop probability of the second packet. Alternatively, in order that ECN marking can be performed on the first packet flow and the second packet flow in a balanced manner, the probability of ECN marking of the first packet and the probability of ECN marking of the second packet may be set. Specifically, the probabilities of ECN marking may be so set that the probability of ECN marking of the first packet is lower than the probability of ECN marking of the second packet. The foregoing technical solution can meet the service requirement of the first packet flow and the service requirement of the second packet flow, and implement more balanced service processing.

On a basis that the probability of ECN marking of the first packet is lower than the probability of ECN marking of the second packet, the forwarding apparatus performs ECN marking on the second packet, and avoids performing ECN marking on the first packet.

After the forwarding apparatus performs ECN marking on the second packet, the forwarding apparatus may store, in the second memory, the second packet on which ECN marking is performed. Further, the second packet on which ECN marking is performed may be enqueued to the first in first out queue stored in the second memory.

It should be noted that, the first packet flow in this application is a plurality of packets having a same feature. At least one field in a packet header may be used to indicate a feature of a packet. For example, a plurality of IP packets having a same destination IP address may form the first packet flow. According to the foregoing example, if destination IP addresses of two IP packets are different, the two IP packets belong to different packet flows, for example, belong to the first packet flow and the second packet flow respectively. For another example, a plurality of IP packets having a same destination IP address and a same source IP address may form the first packet flow. For another example, a plurality of IP packets having a same quintuple may form the first packet flow. In addition, an inbound port configured to receive a packet may also be configured to indicate a feature of a packet. For example, if a plurality of packets are received by a same inbound port on the physical interface card 1233, the plurality of packets belong to the first packet flow. If a plurality of packets are received by different inbound ports, the plurality of packets do not belong to a same packet flow. The packet in this application may be an IP packet or another packet. For example, the packet in this application may be an Ethernet frame. The second packet flow in this application is a plurality of packets having a same feature. At least one field in a packet header may be used to indicate a feature of a packet. For a specific implementation of the field in the packet field, refer to the foregoing descriptions about the first packet flow. It should be noted that, the feature of the packet in the first packet flow is different from the feature of the packet in the second packet flow.

It may be understood that, the memory 302 may store and maintain only one packet queue, for example, the packet queue formed by the first packet flow. The memory 302 may also store and maintain a plurality of packet queues simultaneously, for example, the packet queue formed by the first packet flow and the packet queue formed by the second packet flow. In addition, scheduling priorities of the plurality of packet queues may be the same or may be different. When a scheduling priority of the packet queue formed by the first packet flow is higher than a scheduling priority of the packet queue formed by the second packet flow, the packet in the packet queue formed by the first packet flow is scheduled out of the memory 302 earlier than the packet in the packet queue formed by the second packet flow. Correspondingly, the queue manager 602 may store and maintain only one packet descriptor queue, for example, a packet descriptor queue corresponding to the packet queue formed by the first packet flow. The queue manager 602 may also store and maintain a plurality of packet descriptor queues simultaneously, for example, the packet descriptor queue corresponding to the packet queue formed by the first packet flow, and a packet descriptor queue corresponding to the packet queue formed by the second packet flow. Correspondingly, the WRED circuit 603 may perform drop management on a packet of only one packet flow, for example, perform drop management on only the packet of the first packet flow. The WRED circuit 603 may also perform drop management on packets of a plurality of packet flows simultaneously, for example, perform drop management on the packet of the first packet flow and the packet of the second packet flow.

Optionally, in the foregoing technical solution, when the forwarding apparatus determines that ECN marking does not need to be performed on the first packet, the method further includes the forwarding apparatus determines, based on the at least two types of information related to the first packet, whether the first packet needs to be dropped, and when the forwarding apparatus determines that the first packet does not need to be dropped, the forwarding apparatus stores the first packet in the first memory.

Optionally, in the foregoing technical solution, that the forwarding apparatus determines, based on the at least two types of information related to the first packet, whether ECN marking needs to be performed on the first packet includes the forwarding apparatus determines a WRED algorithm based on the at least two types of information related to the first packet, and the forwarding apparatus determines, according to the WRED algorithm, whether ECN marking needs to be performed on the first packet.

Alternatively, in the foregoing technical solution, that the forwarding apparatus determines, based on the at least two types of information related to the first packet, whether the first packet needs to be dropped includes the forwarding apparatus determines a WRED algorithm based on the at least two types of information related to the first packet, and the forwarding apparatus determines, according to the WRED algorithm, whether the first packet needs to be dropped.

Optionally, in the foregoing technical solution, the field used to indicate the scheduling priority in the first packet is an EXP field in an MPLS label, a PCP field in a VLAN tag, or a DSCP field in an IP header.

For the EXP field, refer to the descriptions in the RFC 3032 published by the IETF.

For the PCP field, refer to the descriptions in the IEEE802.1P published by the IEEE.

Scheduling priorities are used to indicate a sequence of scheduling packets. A packet with a high scheduling priority is scheduled earlier than a packet with a low scheduling priority. For example, for a plurality of packets stored in the memory, a packet with a high scheduling priority is scheduled out of the memory earlier than a packet with a low scheduling priority. After a packet is scheduled out of the memory, the packet is sent by a transmit port.

Optionally, in the foregoing technical solution, when the scheduling priority of the first packet is higher than the scheduling priority of the second packet, the drop priority of the first packet is lower than the drop priority of the second packet.

A drop priority is used to indicate a drop probability of a packet. A drop probability of a packet with a high priority is higher than a drop probability of a packet with a low priority.

Optionally, in the foregoing technical solution, when the scheduling priority of the first packet is lower than the scheduling priority of the second packet, the drop priority of the first packet is higher than the drop priority of the second packet.

Optionally, in the foregoing technical solution, when the protocol drop sensitivity of the first packet is higher than the protocol drop sensitivity of the second packet, the drop priority of the first packet is lower than the drop priority of the second packet.

For example, the first packet may be a TCP packet, and the second packet may be a UDP packet. That the drop priority of the first packet is lower than the drop priority of the second packet may cause the drop probability of the first packet to be lower than the drop probability of the second packet. The drop probability of the first packet is relatively low. Therefore, a probability that a TCP sender sending the first packet flow reduces a transmission rate of the first packet flow due to dropping of the first packet is reduced. This helps the TCP sender keep the transmission rate of the first packet flow stable.

In the foregoing technical solution, on a basis that the probability of ECN marking of the first packet is lower than the probability of ECN marking of the second packet, the forwarding apparatus performs ECN marking on the second packet, and avoids performing ECN marking on the first packet. Alternatively, on a basis that the drop probability of the first packet is lower than the drop probability of the second packet, the forwarding apparatus stores the first packet in the first memory, and avoids storing the second packet in the second memory.

Optionally, after the forwarding apparatus determines the at least two types of information related to the first packet, and before the forwarding apparatus determines, based on the at least two types of information related to the first packet, whether the first packet needs to be dropped, the method further includes the forwarding apparatus determines, based on the at least two types of information related to the first packet, that ECN marking does not need to be performed on the first packet.

Figure 7:
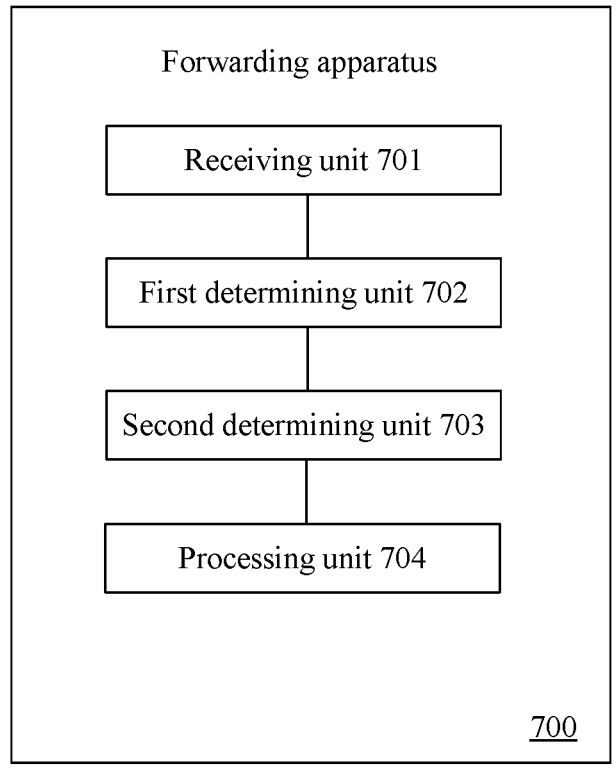
FIG. 7 is a schematic structural diagram of a forwarding apparatus according to this application.

FIG. 7 is a schematic structural diagram of a forwarding apparatus according to this application. The forwarding apparatus 700 may be configured to perform S501, S502, S503, and S504. Referring to FIG. 7, the forwarding apparatus 700 includes a receiving unit 701, a first determining unit 702, a second determining unit 703, and a processing unit 704. The processing unit 704 may be specifically a marking unit or a dropping unit.

The receiving unit 701 is configured to receive a first packet, where the first packet belongs to a first packet flow, the forwarding apparatus includes a first transmit port and a first memory coupled with the first transmit port, the first memory is configured to store the packets that is in the first packet flow and received by the forwarding apparatus, and the first transmit port is configured to send the packets that is in the first packet flow and stored in the first memory.

The first determining unit 702 is configured to determine at least two types of information in four types of information related to the first packet.

Four types of information related to the first packet are respectively a duration of staying in the first memory by the first packet flow when the first packet is received, usage of the first memory when the first packet is received, whether the first packet flow is a victim of a congestion control mechanism when the first packet is received, where a class of service of the first packet flow is a first class of service, and when the forwarding apparatus receives a backpressure signal corresponding to the first class of service through the transmit port of the forwarding apparatus, the first packet flow is a victim of the congestion control mechanism, or when the forwarding apparatus does not receive a backpressure signal corresponding to the first class of service through the transmit port of the forwarding apparatus, the first packet flow is not a victim of the congestion control mechanism, and a drop priority of the first packet, where the drop priority of the first packet is determined based on a field used to indicate a scheduling priority in the first packet, or is determined based on protocol drop sensitivity of the first packet.

For the four types of information related to the first packet, refer to the descriptions about the first type of information, the second type of information, the third type of information, and the fourth type of information. Details are not further described herein.

The second determining unit 703 is configured to determine, based on the at least two types of information related to the first packet, whether ECN marking needs to be performed on the first packet.

Alternatively, the second determining unit 703 is configured to determine, based on the at least two types of information related to the first packet, whether the first packet needs to be dropped.

The marking unit is configured to perform ECN marking on the first packet when it is determined that ECN marking needs to be performed on the first packet.

The dropping unit is configured to store the first packet in the first memory when it is determined that the first packet does not need to be dropped.

Further, the receiving unit 701 may be configured to perform S501. The first determining unit 702 may be configured to perform S502. The second determining unit 703 may be configured to perform S503. The marking unit may be configured to perform S504.

Optionally, in the foregoing technical solution, the receiving unit is further configured to receive a second packet, where the second packet belongs to a second packet flow, the forwarding apparatus includes a second transmit port and a second memory coupled with the second transmit port, the second memory is configured to store the packets that is in the second packet flow and received by the forwarding apparatus, and the second transmit port is configured to send the packets that is in the second packet flow and stored in the second memory, and the first determining unit is further configured to determine at least two types of information in four types of information related to the second packet.

Four types of information related to the second packet are respectively a duration of staying in the second memory by the second packet flow when the second packet is received, usage of the second memory when the second packet is received, indicated by the sixth information, whether the second packet flow is a victim of the congestion control mechanism when the second packet is received, where a class of service of the second packet flow is a second class of service, and when the forwarding apparatus receives a backpressure signal corresponding to the second class of service through a receive port of the forwarding apparatus, the second packet flow is a victim of the congestion control mechanism, or when the forwarding apparatus does not receive a backpressure signal corresponding to the second class of service through the transmit port of the forwarding apparatus, the second packet flow is not a victim of the congestion control mechanism, and a drop priority of the second packet, where the drop priority of the second packet is determined based on a field used to indicate a scheduling priority in the second packet, or is determined based on protocol drop sensitivity of the second packet.

The second determining unit is further configured to, when the duration of staying in the first memory by the first packet flow is longer than the duration of staying in the second memory by the second packet flow, and at least one of the following three conditions is satisfied, determine that a probability of ECN marking of the first packet is higher than a probability of ECN marking of the second packet the usage of the first memory is equal to the usage of the second memory, the first packet flow and the second packet flow are victims of the congestion control mechanism, and the drop priority of the first packet is equal to the drop priority of the second packet, or when the usage of the first memory is higher than the usage of the second memory, and at least one of the following three conditions is satisfied, determine that a probability of ECN marking of the first packet is higher than a probability of ECN marking of the second packet the duration of staying in the first memory by the first packet flow is equal to the duration of staying in the second memory by the second packet flow, the first packet flow and the second packet flow are victims of the congestion control mechanism, and the drop priority of the first packet is equal to the drop priority of the second packet, or when the first packet flow is a victim of the congestion control mechanism and the second packet flow is not a victim of the congestion control mechanism, and at least one of the following three conditions is satisfied, determine that a probability of ECN marking of the first packet is lower than a probability of ECN marking of the second packet the duration of staying in the first memory by the first packet flow is equal to the duration of staying in the second memory by the second packet flow, the usage of the first memory is equal to the usage of the second memory, and the drop priority of the first packet is equal to the drop priority of the second packet, or when the drop priority of the first packet is lower than the drop priority of the second packet, and at least one of the following three conditions is satisfied, determine that a probability of ECN marking of the first packet is lower than a probability of ECN marking of the second packet the duration of staying in the first memory by the first packet flow is equal to the duration of staying in the second memory by the second packet flow, the usage of the first memory is equal to the usage of the second memory, and the first packet flow and the second packet flow are victims of the congestion control mechanism, and the processing unit is further configured to on a basis that the probability of ECN marking of the first packet is lower than the probability of ECN marking of the second packet, perform ECN marking on the second packet, and avoid performing ECN marking on the first packet.

Optionally, when the processing unit 704 is specifically a dropping unit, the second determining unit is further configured to, when the duration of staying in the first memory by the first packet flow is longer than the duration of staying in the second memory by the second packet flow, and at least one of the following three conditions is satisfied, determine that a drop probability of the first packet is higher than a drop probability of the second packet the usage of the first memory is equal to the usage of the second memory, the first packet flow and the second packet flow are victims of the congestion control mechanism, and the drop priority of the first packet is equal to the drop priority of the second packet, or when the usage of the first memory is higher than the usage of the second memory, and at least one of the following three conditions is satisfied, determine that a drop probability of the first packet is higher than a drop probability of the second packet the duration of staying in the first memory by the first packet flow is equal to the duration of staying in the second memory by the second packet flow, the first packet flow and the second packet flow are victims of the congestion control mechanism, and the drop priority of the first packet is equal to the drop priority of the second packet, or when the first packet flow is a victim of the congestion control mechanism and the second packet flow is not a victim of the congestion control mechanism, and at least one of the following three conditions is satisfied, determine that a drop probability of the first packet is lower than a drop probability of the second packet the duration of staying in the first memory by the first packet flow is equal to the duration of staying in the second memory by the second packet flow, the usage of the first memory is equal to the usage of the second memory, and the drop priority of the first packet is equal to the drop priority of the second packet, or when the drop priority of the first packet is lower than the drop priority of the second packet, and at least one of the following three conditions is satisfied, determine that a drop probability of the first packet is lower than a drop probability of the second packet a transmission rate of sending the first packet flow by the forwarding apparatus through the first transmit port is equal to a transmission rate of sending the second packet flow by the forwarding apparatus through the second transmit port, the usage of the first memory is equal to the usage of the second memory, and the first packet flow and the second packet flow are victims of the congestion control mechanism, and the processing unit 704 is further configured to on a basis that the drop probability of the first packet is lower than the drop probability of the second packet, store the first packet in the first memory, and avoid storing the second packet in the second memory.

Optionally, in the foregoing technical solution, when the second determining unit determines that ECN marking does not need to be performed on the first packet, the second determining unit is further configured to determine, based on the at least two types of information related to the first packet, whether the first packet needs to be dropped, and the processing unit is further configured to store the first packet in the first memory when the second determining unit determines that the first packet does not need to be dropped.

Optionally, in the foregoing technical solution, the first determining unit is configured to determine a WRED algorithm based on the at least two types of information related to the first packet, and determine, according to the WRED algorithm, whether ECN marking needs to be performed on the first packet.

Optionally, in the foregoing technical solution, the field used to indicate the scheduling priority in the first packet is an EXP field in a MPLS label, a PCP field in a VLAN tag, or a DSCP field in an IP header.

Optionally, in the foregoing technical solution, when the scheduling priority of the first packet is higher than the scheduling priority of the second packet, the drop priority of the first packet is lower than the drop priority of the second packet.

Optionally, in the foregoing technical solution, when the processing unit 704 is specifically a dropping unit, after the first determining unit 702 determines the at least two types of information related to the first packet, and before the second determining unit 703 determines, based on the at least two types of information related to the first packet, whether the first packet needs to be dropped, the second determining unit 703 is further configured to determine, based on the at least two types of information related to the first packet, that ECN marking does not need to be performed on the first packet.

For specific implementations of the receiving unit 701, the first determining unit 702, the second determining unit 703, and the processing unit 704, refer to the descriptions in the embodiment shown in FIG. 5. Details are not further described herein.

In addition, the forwarding apparatus 700 may further include the traffic manager 600 shown in FIG. 6. That is, the traffic manager 600 may further implement a function of the forwarding apparatus 700. Further, the receiving unit 701 may be implemented by the AQM circuit 604. The first determining unit 702 may be implemented by the AQM circuit 604. The second determining unit 703 may be implemented by the AQM circuit 604 and the WRED circuit 603. The processing unit 704 may be implemented by the WRED circuit 603. For specific implementations of the receiving unit 701, the first determining unit 702, the second determining unit 703, and the processing unit 704, refer to the descriptions in the embodiment shown in FIG. 6. Details are not further described herein.

Figure 8:
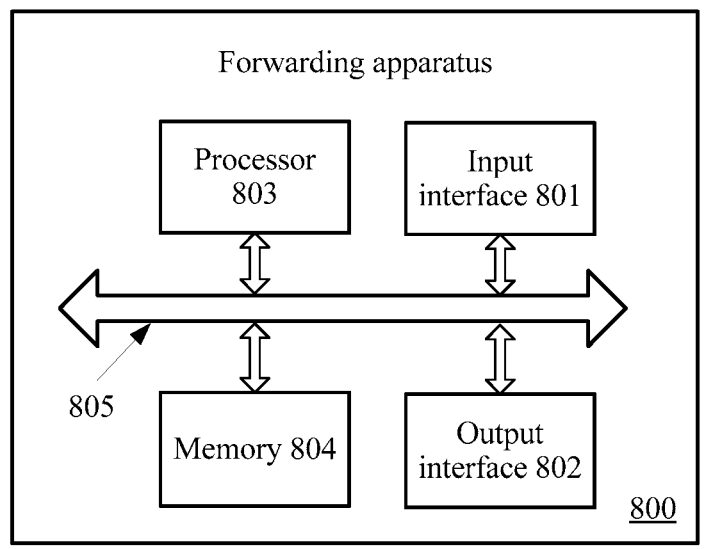
FIG. 8 is a schematic structural diagram of a forwarding apparatus according to this application.

FIG. 8 is a schematic structural diagram of a forwarding apparatus according to this application. A forwarding apparatus 800 may be configured to perform the method shown in FIG. 5. Referring to FIG. 8, the forwarding apparatus 800 includes an input interface 801, an output interface 802, a processor 803, a memory 804, and a bus 805. The input interface 801, the output interface 802, the processor 803, and the memory 804 can communicate with each other using the bus 805. The input interface 801 is configured to receive a packet. The output interface 802 is configured to send a packet. The memory 804 is configured to store a computer program. In addition, the memory 804 may be configured to store a to-be-sent packet. The processor 803 may perform the method shown in FIG. 5 by accessing the computer program in the memory 804. For a specific implementation of performing the method shown in FIG. 5 by the processor 803 by accessing the computer program in the memory 804, refer to the descriptions about the embodiment shown in FIG. 5. Details are not further described herein.

In addition, the forwarding apparatus 800 may further include the traffic manager 600 shown in FIG. 6. That is, the traffic manager 600 may further implement a function of the forwarding apparatus 800. Further, the input interface 801 may be implemented by the network processor 1242. The output interface 802 may be implemented by the physical interface card 1243. The processor 803 may be implemented by the AQM circuit 604 and the WRED circuit 603. The memory 804 may be implemented by the memory 403. For specific implementations of the input interface 801, the output interface 802, the processor 803, and the memory 804, refer to the descriptions in the embodiment shown in FIG. 6. Details are not further described herein.

This application further provides a computer readable storage medium. The computer readable storage medium is configured to store the computer program. When the computer program is executed, a computer may be enabled to perform the method shown in FIG. 5. For details, refer to descriptions about the embodiment shown in FIG. 5. Details are not further described herein. In a possible design, the computer readable storage medium may be a non-volatile readable storage medium.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, the modules and method steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method for each specific application to implement described functions.

It may be clearly understood by a person skilled in the art that, for the purpose of convenient and brief description, for a detailed working process of the foregoing system, apparatus, and module, reference may be made to a corresponding process in the foregoing method embodiments, and details are not further described herein.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired or wireless manner. The wired manner may be a coaxial cable, an optical fiber, or a digital subscriber line (DSL). The wireless manner may be infrared, wireless, or microwave. The computer-readable storage medium may be any usable medium accessible by a computer, or a data storage device integrating one or more usable media, such as a server or a data center. The usable medium may be a magnetic medium, an optical medium, a semiconductor medium, or the like. The embodiments in this specification are all described in a progressive manner. For same or similar parts in the embodiments, mutual reference may be made, and each embodiment focuses on a difference from another embodiment. Especially, apparatus and system embodiments are basically similar to the method embodiments, and therefore are described briefly. For related parts, refer to descriptions about the parts in the method embodiments. The magnetic medium may be a floppy disk, a hard disk, or a magnetic tape. The optical medium may be a digital versatile disc (DVD). The semiconductor medium may be a solid state disk (SSD).

What is claimed is:

1. A packet processing method, implemented by a forwarding apparatus, wherein the packet processing method comprises:
   receiving a first packet, wherein the first packet belongs to a first packet flow, and wherein the first packet flow comprises a first plurality of packets;
   storing the first plurality of packets in a first memory and sending the first plurality of packets using a first transmit port;
   determining whether to perform explicit congestion notification (ECN) marking on the first packet based on a first probability of ECN marking of the first packet, a second probability of ECN marking of a second packet, and information related to the first packet, wherein the information comprises at least two of a duration of staying in the first memory based on the first packet flow when the first packet is received, usage of the first memory when the first packet is received, whether the first packet flow is a victim of a congestion control mechanism when receiving the first packet or a drop priority of the first packet; and
   performing the ECN marking on the first packet when determining the ECN marking on the first packet is needed.

2. The packet processing method of claim 1, wherein the first packet flow is associated with a first class of service, and wherein the first packet flow is the victim of the congestion control mechanism when the forwarding apparatus receives a backpressure signal of the first class of service through the first transmit port, or is not the victim of the congestion control mechanism when the forwarding apparatus does not receive the backpressure signal of the first class of service through the first transmit port.

3. The packet processing method of claim 1, further comprising:
   receiving the second packet, wherein the second packet belongs to a second packet flow;
   storing a second plurality of packets that is in the second packet flow using a second memory of the forwarding apparatus;
   sending the second plurality of packets using a second transmit port of the forwarding apparatus; and
   performing the ECN marking on the second packet and avoiding performing the ECN marking on the first packet when the first probability of the ECN marking on the first packet is lower than the second probability of the ECN marking on the second packet.

4. The packet processing method of claim 1, wherein when determining to not perform the ECN marking on the first packet, the packet processing method further comprises:
   determining whether to drop the first packet based on the information; and
   storing the first packet in the first memory when determining dropping the first packet is not needed.

5. The packet processing method of claim 1, further comprising:
   determining a weighted random early detection (WRED) algorithm based on the information; and
   determining whether to perform the ECN marking on the first packet according to the WRED algorithm.

6. The packet processing method of claim 1, wherein the drop priority of the first packet is based on a field in the first packet that indicates a scheduling priority in the first packet or is based on a protocol drop sensitivity of the first packet.

7. The packet processing method of claim 6, wherein the field is an experimental bit (EXP) field in a multiprotocol label switching (MPLS) label, a priority code point (PCP) field in a virtual local area network (VLAN) tag, or a differentiated services code point (DSCP) field in an Internet Protocol (IP) header.

8. A forwarding apparatus, comprising:
an input interface configured to receive a first packet, wherein the first packet belongs to a first packet flow, and wherein the first packet flow comprises a first plurality of packets;
a first memory coupled with the input interface and configured to store the first plurality of packets;
a first transmit port coupled to the first memory and the input interface and configured to send the first plurality of packets; and
a processor coupled to the input interface, the first memory, and the first transmit port and configured to:
determine whether to perform explicit congestion notification (ECN) marking on the first packet based on a first probability of ECN marking of the first packet, a second probability of ECN marking of a second packet, and information related to the first packet, wherein the information comprises at least two of a duration of staying in the first memory based on the first packet flow when the first packet is received, usage of the first memory when the first packet is received, whether the first packet flow is a victim of a congestion control mechanism when receiving the first packet or a drop priority of the first packet; and
perform the ECN marking on the first packet when determining to perform the ECN marking.

9. The forwarding apparatus of claim 8, wherein the input interface is further configured to receive the second packet, wherein the second packet belongs to a second packet flow, wherein the second packet flow comprises a second plurality of packets, and wherein the forwarding apparatus further comprises:
a second memory coupled to the input interface and configured to store the second plurality of packets; and
a second transmit port coupled to the second memory and configured to send the second plurality of packets,
wherein the processor is further configured to perform the ECN marking on the second packet and avoid performing the ECN marking on the first packet when the first probability of the ECN marking of the first packet is lower than the second probability of the ECN marking of the second packet.

10. The forwarding apparatus of claim 8, wherein when determining to not perform the ECN marking on the first packet, the processor is further configured to:
determine whether to drop the first packet based on the information; and
store the first packet in the first memory when determining to drop the first packet is not needed.

11. The forwarding apparatus of claim 8, wherein the processor is further configured to:
determine a weighted random early detection (WRED) algorithm based on the information; and
determine whether the ECN marking on the first packet is needed according to the WRED algorithm.

12. The forwarding apparatus of claim 8, wherein the first packet flow is a first class of service, and wherein the first packet flow is the victim of the congestion control mechanism when the forwarding apparatus receives a backpressure signal of the first class of service, or the first packet flow is not the victim of the congestion control mechanism when the forwarding apparatus does not receive the backpressure signal.

13. The forwarding apparatus of claim 8, wherein the drop priority of the first packet is based on a field in the first packet that indicates a scheduling priority in the first packet or is based on a protocol drop sensitivity of the first packet.

14. The forwarding apparatus of claim 13, wherein the field indicates the scheduling priority in the first packet is an experimental bit (EXP) field in a multiprotocol label switching (MPLS) label, a priority code point (PCP) field in a virtual local area network (VLAN) tag, or a differentiated services code point (DSCP) field in an Internet Protocol (IP) header.

15. The forwarding apparatus of claim 9, wherein the processor is further configured to:
determine that the first probability of the ECN marking of the first packet is higher than the second probability of the ECN marking of the second packet when the duration of staying in the first memory by the first packet flow is longer than a duration of staying in the second memory by the second packet flow and satisfying at least one of the following:
the usage of the first memory is equal to a usage of the second memory;
the first packet flow and the second packet flow are victims of the congestion control mechanism, or
the drop priority of the first packet is equal to a drop priority of the second packet;
determine that the first probability of the ECN marking of the first packet is higher than the second probability of the ECN marking of the second packet when the usage of the first memory is higher than the usage of the second memory and satisfying at least one of the following:
the duration of staying in the first memory by the first packet flow is equal to the duration of staying in the second memory by the second packet flow;
the first packet flow and the second packet flow are the victims of the congestion control mechanism, or
the drop priority of the first packet is equal to the drop priority of the second packet;
determine that the first probability of the ECN marking of the first packet is lower than the second probability of the ECN marking of the second packet when the first packet flow is the victim of the congestion control mechanism and the second packet flow is not the victim of the congestion control mechanism, and satisfying at least one of the following:
the duration of staying in the first memory by the first packet flow is equal to the duration of staying in the second memory by the second packet flow;
the usage of the first memory is equal to the usage of the second memory; or
the drop priority of the first packet is equal to the drop priority of the second packet; or
determine that the first probability of the ECN marking of the first packet is lower than the second probability of the ECN marking of the second packet when the drop priority of the first packet is lower than the drop priority of the second packet, and satisfying at least one of the following:
the duration of staying in the first memory by the first packet flow is equal to the duration of staying in the second memory by the second packet flow;
the usage of the first memory is equal to the usage of the second memory; or the first packet flow and the second packet flow are the victims of the congestion control mechanism.

16. A forwarding apparatus, comprising:
an input interface configured to receive a first packet, wherein the first packet belongs to a first packet flow;
a first memory, configured to store a first plurality of packets, packets, wherein the first packet flow comprises the first plurality of packets;
a first transmit port coupled to the first memory and configured to send the first plurality of packets; and
a processor coupled to the input interface, the first memory, and the first transmit port and configured to:
determine whether to drop the first packet based on a first drop probability of the first packet, a second drop probability of a second packet, and information related to the first packet, wherein the information comprises at least two of a duration of staying in the first memory based on the first packet flow when the first packet is received, usage of the first memory when the first packet is received, whether the first packet flow is a victim of a congestion control mechanism when receiving the first packet, or a drop priority of the first packet; and
store the first packet in the first memory when determining to drop the first packet is not needed.

17. The forwarding apparatus of claim 16, wherein the input interface is further configured to receive the second packet, wherein the second packet belongs to a second packet flow, wherein the second packet flow comprises a second plurality of packets, and wherein the forwarding apparatus further comprises:
a second memory coupled to the input interface and configured to store the second plurality of packets; and
a second transmit port coupled to the second memory and configured to send the second plurality of packets,
wherein the processor is further configured to store the first packet in the first memory and avoid storing the second packet in the second memory when the first drop probability of the first packet is lower than the second drop probability of the second packet.

18. The forwarding apparatus of claim 16, wherein the processor is further configured to determine whether to not perform explicit congestion notification (ECN) marking on the first packet based on the information.

19. The forwarding apparatus of claim 16 wherein the first packet flow comprises a first class of service, and wherein the first packet flow is the victim of the congestion control mechanism when the forwarding apparatus receives a backpressure signal of the first class of service, or the first packet flow is not the victim of the congestion control mechanism when the forwarding apparatus does not receive the backpressure signal of the first class of service.

20. The forwarding apparatus of claim 16, wherein the drop priority of the first packet is based on a field that indicates a scheduling priority in the first packet and is based on a protocol drop sensitivity of the first packet.

* * * * *

UNITED STATES PATENT AND TRADEMARK OFFICE
CERTIFICATE OF CORRECTION

PATENT NO. : 11,223,568 B2
APPLICATION NO. : 16/832666
DATED : January 11, 2022
INVENTOR(S) : Nan Li and Chao Huang It is certified that error appears in the above-identified patent and that said Letters Patent is hereby corrected as shown below:

In the Claims

Claim 16, Column 45, Line 7: "packets, packets, wherein the" should read "packets, wherein the"

Signed and Sealed this
Nineteenth Day of April, 2022

Katherine Kelly Vidal
*Director of the United States Patent and Trademark Office*